United States Patent
Zhao et al.

(10) Patent No.: US 10,375,411 B2
(45) Date of Patent: Aug. 6, 2019

(54) PREDICTOR FOR DEPTH MAP INTRA CODING

(71) Applicants: Xin Zhao, San Diego, CA (US); Li Zhang, San Diego, CA (US); Ying Chen, San Diego, CA (US); QUALCOMM Incorporated, San Diego, CA (US)

(72) Inventors: Xin Zhao, San Diego, CA (US); Li Zhang, San Diego, CA (US); Ying Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 292 days.

(21) Appl. No.: 14/773,161

(22) PCT Filed: Mar. 15, 2013

(86) PCT No.: PCT/CN2013/000287
§ 371 (c)(1),
(2) Date: Sep. 4, 2015

(87) PCT Pub. No.: WO2014/139049
PCT Pub. Date: Sep. 18, 2014

(65) Prior Publication Data
US 2016/0029038 A1 Jan. 28, 2016

(51) Int. Cl.
*H04N 19/50* (2014.01)
*H04N 19/119* (2014.01)
(Continued)

(52) U.S. Cl.
CPC ............ *H04N 19/50* (2014.11); *H04N 19/11* (2014.11); *H04N 19/119* (2014.11);
(Continued)

(58) Field of Classification Search
CPC ...... H04N 19/50; H04N 19/11; H04N 19/119; H04N 19/124; H04N 19/176; H04N 19/182; H04N 19/597; H04N 19/91
(Continued)

(56) References Cited

U.S. PATENT DOCUMENTS

| 9,402,066 B2 | 7/2016 | Jeong et al. |
| 2010/0046612 A1 | 2/2010 | Sun et al. |

(Continued)

FOREIGN PATENT DOCUMENTS

| CN | 102917228 A | 2/2013 |
| JP | 2013509022 A | 3/2013 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

In an example, a process for coding video data includes determining a partitioning pattern for a block of depth values comprising assigning one or more samples of the block to a first partition and assigning one or more other samples of the block to a second partition. The process also includes determining a predicted value for at least one of the first partition and the second partition based on the determined partition pattern. The process also includes coding the at least one of the first partition and the second partition based on the predicted value.

36 Claims, 17 Drawing Sheets

(51) Int. Cl.
  *H04N 19/182* (2014.01)
  *H04N 19/11* (2014.01)
  *H04N 19/124* (2014.01)
  *H04N 19/176* (2014.01)
  *H04N 19/61* (2014.01)
  *H04N 19/597* (2014.01)

(52) U.S. Cl.
  CPC ......... *H04N 19/124* (2014.11); *H04N 19/176* (2014.11); *H04N 19/182* (2014.11); *H04N 19/597* (2014.11); *H04N 19/61* (2014.11)

(58) Field of Classification Search
  USPC .................................................... 375/240.12
  See application file for complete search history.

(56) References Cited

U.S. PATENT DOCUMENTS

| | | | |
|---|---|---|---|
| 2011/0188572 | A1 | 8/2011 | Min et al. |
| 2011/0249734 | A1* | 10/2011 | Segall ............. H04N 19/105 375/240.12 |
| 2012/0147961 | A1 | 6/2012 | Guo et al. |
| 2012/0200669 | A1* | 8/2012 | Lai ..................... G06T 5/002 348/43 |
| 2014/0184744 | A1* | 7/2014 | Liu .................. H04N 19/597 348/43 |
| 2014/0355667 | A1* | 12/2014 | Lei ................... H04N 19/105 375/240.02 |

FOREIGN PATENT DOCUMENTS

| | | |
|---|---|---|
| JP | 2013074304 A | 4/2013 |
| WO | 2011046607 A2 | 4/2011 |
| WO | 2012078388 A1 | 6/2012 |
| WO | 2013022297 A2 | 2/2013 |
| WO | 2013032423 A1 | 3/2013 |
| WO | 2013068567 A1 | 5/2013 |
| WO | 2014008951 A1 | 1/2014 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, Jctvc-L1003_v34, 310 pp.
ITU-T H.264, Series H: Audiovisual and Multimedia Systems, Infrastructure of audiovisual services—Coding of moving video, Advanced video coding for generic audiovisual services, the International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
International Search Report and Written Opinion from International Application No. PCT/CN2013/000287 dated Dec. 26, 2013, 11 pp.
Tech, et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V- B1005_d0, 2nd Meeting: Shanghai, CN, XP030130414, Oct. 13-19, 2012, 118 pp.
ITU-T H.233, Series H: Audiovisual and Multimedia Systems, Infrastructure of audiovisual services—Transmission multiplexing and synchronization; Multiplexing protocol for low bit rate multimedia communication, The International Telecommunication Union. Jul. 2001, 74 pp.
Schwarz, et al., "Description of 3D Video Technology Proposal by Fraunhofer HHI (HEVC compatible; configuration A)," ISO/IEC JTC1/SC29/WG11 MPEG2011/M22570, Geneva, Switzerland, Nov. 2011, 48 pp.
Schwarz, et al., "Description of 3D Video Technology Proposal by Fraunhofer HHI (HEVC compatible, configuration B)", MPEG Meeting; Nov. 28, 2011-Feb. 12, 2011; Geneva; (Motion Picture Expert Group or ISO/IEC JTC1/ SC29/WG11), No. m22571, 22 Nov. 2011, XP030051134; 46 pp.
International Preliminary Report on Patentability from corresponding PCT Application Serial No. PCT/CN2013/000287 dated Sep. 24, 2015 (7 pages).
Chen, et al., "Intra Coding for Depth Maps using Adaptive Boundary Location," Visual Communications and Image Processing (VCIP), 2012 IEEE, IEEE, Nov. 27, 2012, XP032309158, DOI: 10.1109/VCIP.2012.6410744 ISBN: 978-1-4673-4405-0, 6 pp.
Liu, et al.,"New Depth Coding Techniques With Utilization of Corresponding Video," IEEE Transactions on Broadcasting, IEEE Service Center, Piscataway, NJ, US, Jun. 2011, vol. 57, No. 2, pp. 551-561, XP011476783, ISSN: 0018-9316, DOI: 10.1109/TBC.2011.2120750.
Supplementary European Search Report from European Application No. EP13877735, dated Oct. 17, 2016, 11 pp.
Zhao, et al., "3D-CE6.h: Results on Distortion Calculation Simplification for Depth Modeling Mode (DMM) 3," JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://PHENIX.INT-EVRY.FR/JCT2/,, No. JCT3V-00052, Jan. 10, 2013, XP030130468, 4 pp.
Bartnik, et al., "HEVC Extension for Multiview Video Coding and Multiview Video plus Depth Coding", ITU—Telecommunications Standardization Sector Study Group 16 Question 6 Video Coding Experts Group (VCEG), 44nd Meeting: San Jose, CA, USA, Feb. 3-10, 2012, Document VCEG-AR13, 42 pages.
Tech G., et al., "3D-HEVC Test Model 2," JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 126 Pages.
Zhao X., et al., "CE6.h related: Simplified DC predictor for depth intra modes," Joint Collaborative Team on 3D Video Coding Extensions of ITU-T SG 16 WP 3 and ISO/IEC JTC 1/SC 29/WG 11, 4th Meeting: Incheon, KR, Apr. 2013, JCT3V-D0183, pp. 1-5.

* cited by examiner

|  | pT0 | pT1 | pT2 | pT3 | pT4 | pT5 | pT6 | pT7 |
|---|---|---|---|---|---|---|---|---|
| pL0 | C0,0 | C1,0 | C2,0 | C3,0 | C4,0 | C5,0 | C6,0 | C7,0 |
| pL1 | C0,1 | C1,1 | C2,1 | C3,1 | C4,1 | C5,1 | C6,1 | C7,1 |
| pL2 | C0,2 | C1,2 | C2,2 | C3,2 | C4,2 | C5,2 | C6,2 | C7,2 |
| pL3 | C0,3 | C1,3 | C2,3 | C3,3 | C4,3 | C5,3 | C6,3 | C7,3 |
| pL4 | C0,4 | C1,4 | C2,4 | C3,4 | C4,4 | C5,4 | C6,4 | C7,4 |
| pL5 | C0,5 | C1,5 | C2,5 | C3,5 | C4,5 | C5,5 | C6,5 | C7,5 |
| pL6 | C0,6 | C1,6 | C2,6 | C3,6 | C4,6 | C5,6 | C6,6 | C7,6 |
| pL7 | C0,7 | C1,7 | C2,7 | C3,7 | C4,7 | C5,7 | C6,7 | C7,7 |

FIG. 10

PREDICTOR FOR DEPTH MAP INTRA CODING

This application is a national stage entry under 35 U.S.C. § 371 of International Application No. PCT/CN2013/000287, filed Mar. 15, 2013.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The techniques of this disclosure generally relate to intra-coding depth data in video coding. For example, intra-coding depth data may include determining a predicted depth value for a block currently being intra-coded based on depth samples that neighbor the block. In some instances, the block currently being coded may be partitioned into more than one portion. In such instances, all of the reference samples that neighbor the block may be used to determine a predicted value for each partition of the block. Aspects of this disclosure relate to determining a predicted value for partitions of the block based on fewer reference samples, which may reduce complexity and increase accuracy.

In an example, aspects of this disclosure relate to a method of coding video data that includes determining a partitioning pattern for a block of depth values comprising assigning one or more samples of the block to a first partition and assigning one or more other samples of the block to a second partition, determining a predicted value for at least one of the first partition and the second partition based on the determined partition pattern, and coding the at least one of the first partition and the second partition based on the predicted value.

In another example, aspects of this disclosure relate to an apparatus for coding video data that includes one or more processors configured to determine a partitioning pattern for a block of depth values comprising assigning one or more samples of the block to a first partition and assigning one or more other samples of the block to a second partition, determine a predicted value for at least one of the first partition and the second partition based on the determined partition pattern, and code the at least one of the first partition and the second partition based on the predicted value.

In another example, aspects of this disclosure relate to an apparatus for coding video data that includes means for determining a partitioning pattern for a block of depth values comprising assigning one or more samples of the block to a first partition and assigning one or more other samples of the block to a second partition, means for determining a predicted value for at least one of the first partition and the second partition based on the determined partition pattern, and means for coding the at least one of the first partition and the second partition based on the predicted value.

In another example, aspects of this disclosure relate to a non-transitory computer-readable medium comprising instructions stored thereon that, when executed, cause one or more processors to determine a partitioning pattern for a block of depth values comprising assigning one or more samples of the block to a first partition and assigning one or more other samples of the block to a second partition, determine a predicted value for at least one of the first partition and the second partition based on the determined partition pattern, and code the at least one of the first partition and the second partition based on the predicted value.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 10 is a block diagram illustrating a block of depth data and neighboring samples, which may be used to determine a predicted depth value for one or more partitions of the block, according to aspects of this disclosure.

DETAILED DESCRIPTION

Figure 1:
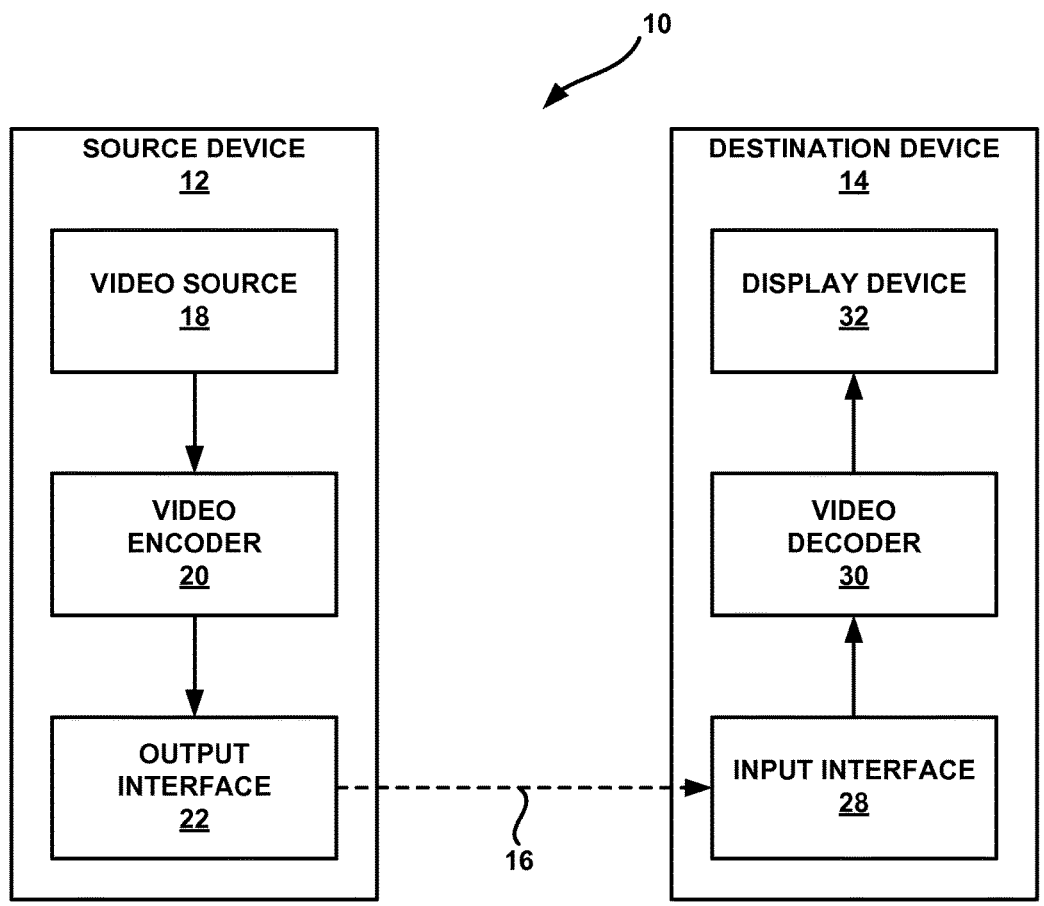
FIG. 1 is a block diagram illustrating an example video encoding and decoding system 10 that may utilize the techniques of this disclosure for depth coding.

In general, the techniques of this disclosure are related to three-dimensional (3D) video coding. That is, video data coded using these techniques may be rendered and displayed to produce a three-dimensional effect. For example, two images of different views (that is, corresponding to two camera perspectives having slightly different horizontal positions) may be displayed substantially simultaneously such that one image is seen by a viewer's left eye, and the other image is seen by the viewer's right eye.

This 3D effect may be achieved using, for example, stereoscopic displays or autostereoscopic displays. Stereoscopic displays may be used in conjunction with eyewear that filters the two images accordingly. For example, passive glasses may filter the images using polarized lenses or different colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture pictures and corresponding depth pictures.

As noted above, images may correspond to a particular temporal instance. Video data may be represented using a sequence of access units, where each access unit includes all data corresponding to a particular temporal instance. Thus, for example, for multiview video data plus depth, texture images from each view for a common temporal instance, plus the depth maps for each of the texture images, may all be included within a particular access unit. An access unit may include data for a texture component, corresponding to a texture image, and a depth component, corresponding to a depth map.

In this manner, 3D video data may be represented using a multiview video plus depth format, in which captured or generated views (texture) are associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values. In general, a block of depth data (a block of samples of a depth map) may be referred to as a depth block. A depth value may refer to a luma value associated with a depth sample. In any case, conventional intra- and inter-coding methods may be applied for depth map coding.

Depth maps commonly include sharp edges and constant areas, and edges in depth maps typically present strong correlations with corresponding texture data. Due to the different statistics and correlations between texture and corresponding depth, different coding schemes have been and continue to be designed for depth maps based on a 2D video codec.

Techniques of this disclosure generally relate to coding depth data, and may be applicable to the High Efficiency Video Coding (HEVC) standard. For example, the Joint Video Team (JVT) recently developed a base version (2D) of HEVC that provides higher efficiency than previously developed video coding standards. A Joint Collaboration Team on 3D Video Coding (JCT-3V) is currently conducting study of two three-dimensional video (3DV) solutions as extensions to HEVC. One example includes a multi-view extension of HEVC that is referred to as MV-HEVC. Another example includes a depth enhanced 3D video extension (3D-HEVC). The latest reference software 3D-HTM version 5.1 for 3D-HEVC is available publically at https://hevc.hhi.fraunhofer.de/svn/svn_3DVCSoftware/tags/HTM-5.1/. The latest software description (document number: B1005) is available from http://phenix.it-sudparis.eu/jct2/doc_end_user/documents/2_Shanghai/wg11/JCT3V-B1005-v1.zip.

In 3D-HEVC, each access unit contains multiple view components, each contains a unique view id, or view order index, or layer id. A view component contains a texture view component as well as a depth view component. A texture view component may be coded as one or more texture slices, while a depth view component may be coded as one or more depth slices.

In some instances, depth data may be intra-coded, which relies on spatial prediction to reduce or remove spatial redundancy within a given picture. For example, in 3D-HEVC, a video coder (e.g., a video encoder or video decoder) may use intra-prediction modes from the base (2D) HEVC standard to code an intra-prediction unit of a depth slice. Intra-modes of the HEVC standard are described in greater detail below with respect to FIG. 4.

In another example, the video coder may use depth modeling modes (DMMs) to code an intra-prediction unit of a depth slice. DMMs of 3D-HEVC are described in greater detail below with respect to FIGS. 5A and 5B. With DMM, the video coder may partition a block of depth data (referred to generally as a depth block) into prediction regions. For example, the video coder may partition a block of depth data using a Wedgelet pattern, defined by an arbitrary line drawn through the block of depth data, or a Contour pattern, which partitions the depth block into two irregularly-shaped regions.

In another example, the video coder may use region boundary chain coding to code an intra-prediction unit of a depth slice. Region boundary chain coding (referred to as simply "chain coding") is described in greater detail below with respect to FIG. 6. In general, the video coder may use chain coding to partition a block of depth data into irregularly shaped regions, which may then be intra-coded.

In still another example, the video coder may use a simplified depth coding (SDC) mode to code an intra-prediction unit of a depth slice. SDC is described in greater detail below with respect to FIG. 7. In some instances, as described in greater detail below, SDC may be implemented in conjunction with DMM. In contrast to the intra-mode coding schemes described above, however, when using an SDC mode, the video coder does not transform or quantize the residual depth values. Rather, in some examples, the video coder may directly code a residual depth values.

As noted above, some coding schemes that are particular to depth map coding include partitioning blocks of a depth map into various prediction regions. For example, blocks of a depth map may be partitioned using Wedgelet patterns, Contour patterns, or chain coded patterns. In general, the video coder may generate a predicted value for each partition of the depth block when coding the depth block. In some instances, the video coder may determine a predicted DC depth value.

A predicted DC depth value is a single predicted value that is applied to predict an entire partition. For example, a "DC value" generally refers to a value that biases components of a block or partition in the same way. In an example for purposes of illustration, a predicted DC value may typically be determined based on an average of neighboring depth samples positioned above and to the left of the block being coded, which is then applied to predict all of the depth values of the block. However, as described in greater detail below, a predicted DC value may generally refer to applying a single predicted value to a partition, without necessarily implying that averaging is performed. For example, in some instances, a predicted DC value may be based on a single value (with no averaging performed). In any case, a predicted DC value may be useful for blocks that do not include a wide variation of values, which may make predicted DC values particularly well suited to constant depth values.

The predicted DC value for each partition may be used to code the depth data. For example, a video encoder may determine a residual for a depth block that includes a difference between the actual depth values of each partition and the respective predicted DC values of each partition. The video encoder may include the residual in an encoded bitstream. A video decoder may parse the residual from the encoded bitstream, determine predicted DC values for each partition, and combine the residual for each partition with the respective predicted DC values for each partition to determine the actual depth values for the block.

In any case, as noted above, the predicted value of a partition may be determined based on depth samples that neighbor the block of depth data currently being coded. For example, a video coder may determine predicted values for each partition of a depth block based on a row of neighboring samples that is positioned above the depth block and a column of neighboring samples that is positioned to the left of the depth block.

In this example, after partitioning the block, the video coder may designate neighboring samples that neighbor a first partition as contributing to a predictor for the first partition. For example, the video coder may average all samples that neighbor the top row or left column of the depth block that are neighbors of the first partition to generate a predictor for the first partition. Likewise, the video coder may designate neighboring samples that neighbor a second partition as contributing to a predictor of the second partition. For example, the video coder may average all samples that neighbor the top row or left column of the depth block that are neighbors of the second partition to generate a predictor for the second partition.

In the example described above, there are a number of mathematical operations associated with generating a predicted DC value. For example, each contributing neighboring sample must be added to determine the average value. In addition, each contributing neighboring sample must be counted to determine the average value. In addition, a division operation is needed to determine the average value.

Moreover, the number of operations to be performed can increase when the size of the depth block increases. As described in greater detail below, in some examples, HEVC allows for blocks that are 32×32 in size. In these examples, for a 32×32 block, there are 64 additions to calculate the sum of reference samples belonging to each partition. There are also 64 additions to count the number of reference samples belonging to each partition. Such operations may increase the computational complexity associated with determining a predicted DC value.

In addition, reference samples (neighboring samples) may be partitioned inaccurately in the example described above. For example, a reference sample and a neighboring depth value may have substantially different values near an edge of a partition. In this example, the reference sample may distort the predicted value of the partition, which may create coding inefficiencies.

Aspects of this disclosure generally relate to techniques for determining a predicted depth value when intra-coding a depth map. For example, according to aspects of this disclosure, a video coder may initially determine a partitioning pattern for a block of depth values. The partitioning pattern may indicate whether the top row of depth values of the block includes depth values assigned only to a first partition, depth values assigned only to a second partition, or depth values assigned to both the first partition and the second partition. The partitioning pattern may also indicate whether the left column of depth values of the block includes depth values assigned only to the first partition, depth values assigned only to the second partition, or depth values assigned to both the first and second partition.

Based on the partitioning pattern, the video coder may determine neighboring samples from which to determine predicted depth values for the first partition and/or the second partition. For example, the video coder may select one or more predetermined neighboring samples based on the partitioning pattern. The video coder may use the selected values to determine a predicted DC value for one or both of the partitions.

In an example for purposes of illustration, if the top row of depth values only includes depth values assigned to the first partition, the video coder may select a single neighboring reference sample in a row above the depth block as a predicted depth value for the first partition. This example leverages the typical characteristic of depth data to include large constant areas. For example, because all of the depth values of the top row of the block are included in the same partition, it is assumed that any neighboring depth value will have the same or a similar value as the partition. Accordingly, rather than averaging all of neighboring samples (as described above) the video coder may select one or more representative samples as a predicted DC value for the partition.

In this way, the techniques may reduce the computational cost associated with determining a predicted depth value for partitions. For example, with respect to the example described above in which all neighboring samples are considered, the techniques may reduce or eliminate the number of addition and division operations that are performed. In addition, the techniques may increase the accuracy of the predicted depth value. For example, as described in greater detail below, the video coder may reduce the introduction of partitioning errors (which may produce an inaccurate predictor) near partition boundaries by selecting one or more representative neighboring samples located away from the partition boundaries.

FIG. 1 is a block diagram illustrating an example video encoding and decoding system 10 that may utilize the techniques of this disclosure for depth coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multi-view coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for depth coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the ITU-T H.264/MPEG-4 (AVC) standard, which was formulated by the ITU-T Video Coding Experts Group (VCEG) together with the ISO/IEC Moving Picture Experts Group (MPEG) as the product of a collective partnership known as the Joint Video Team (JVT). Another video coding standard includes the H.264 standard, including its Scalable Video Coding (SVC) and Multiview Video Coding (MVC) extensions. The H.264 standard is described in ITU-T Recommendation H.264, Advanced Video Coding for generic audiovisual services, by the ITU-T Study Group. The Joint Video Team (JVT) continues to work on extensions to H.264/MPEG-4 AVC. The latest joint draft of MVC is described in "Advanced video coding for generic audiovisual services," ITU-T Recommendation H.264, March 2010.

Alternatively, video encoder 20 and video decoder 30 may operate according to a High Efficiency Video Coding (HEVC) standard, and may conform to the HEVC Test Model (HM). HEVC was developed by JCT-VC of ITU-T VCEG and ISO/IEC MPEG. A recent draft of HEVC is available from http://phenix.int-evry.fr/jct/doc_end_user/documents/12_Geneva/wg11/JCTVC-L1003-v14.zip. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units.

Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some instances, video encoder 20 and/or video decoder 30 may intra-code depth data. For example, in 3D-HEVC, video encoder 20 and/or video decoder 30 may use intra-prediction modes from the base (2D) HEVC standard to code an intra-prediction unit of a depth slice. In another example, video encoder 20 and/or video decoder 30 may use depth modeling modes (DMMs) to code an intra-prediction unit of a depth slice. In another example, video encoder 20 and/or video decoder 30 may use region boundary chain coding to code an intra-prediction unit of a depth slice. In still another example, video encoder 20 and/or video decoder 30 may use a simplified depth coding (SDC) mode to code an intra-prediction unit of a depth slice.

One or more of the intra-coding modes above may include generating a predicted DC value for a depth block. For example, as noted above, a predicted DC value may be a single predicted value applied to an entire partition that is based on neighboring sample values. In examples in which video encoder 20 and/or video decoder 30 partitions a depth block into more than one region (e.g., using a DMM Wedgelet pattern, a DMM Contour pattern, chain coding, SDC mode 2, or the like), video encoder 20 and/or video decoder 30 may determine a predicted DC value for each partition of a depth block.

Typically, video encoder 20 and/or video decoder 30 may determine a predicted DC value based on an average of all neighboring samples (referred to as reference samples) positioned in the row above the depth block being coded as well as the column to the left of the depth block being coded. However, such an approach requires video encoder 20 and/or video encoder 30 to perform a relatively large number of mathematical operations. For example, video encoder 20 and/or video encoder 30 must add and count each reference sample that contributes to the average value for each partition. In addition, video encoder 20 and/or video encoder 30 must perform a division operation for each partition to determine the average value for each partition, which may add complexity for hardware components of video encoder 20 and/or video encoder 30.

The computational costs associated with generating a predicted DC value described above can increase as the size of the depth block being coded increases. For example, as noted above, the HEVC standard allows for blocks that are 32×32 in size. Accordingly, for a 32×32 block, video encoder 20 and/or video encoder 30 perform 64 additions to calculate the sum of reference samples for to each partition and 64 additions to count the number of reference samples for each partition.

In addition, when using all neighboring reference samples to generate a predicted DC value, video encoder 20 and/or video decoder 30 may introduce prediction errors near edges of a partition. For example, a reference sample and a neighboring depth value may have substantially different values near an edge of a partition. Accordingly, as described in greater detail with respect to FIGS. 9A and 9B below, reference samples near the edge of a partition may distort a predicted DC value for the partition, which may create coding inefficiencies (e.g., large residual values for coding).

Aspects of this disclosure generally relate to techniques that determine a predicted DC depth value when intra-coding a depth map. For example, aspects of this disclosure relate to techniques for determining a single predicted value for a partition of depth data without performing the averaging operations on all reference samples, as described above. Aspects of this disclosure may generally refer to a "DC" predicted value, as the predicted value may be generated using a DC intra-mode associated with one of the intra-modes described above (e.g., HEVC intra-modes, DMMs, chain coding modes, SDC modes, or the like). References to a predicted DC value, however, do not necessarily imply that averaging is performed.

According to aspects of this disclosure, video encoder 20 and/or video decoder 30 may determine a partitioning pattern for a block of depth values that includes assigning one or more samples of the block to a first partition and assigning one or more other samples of the block to a second partition. Video encoder 20 and/or video decoder 30 may then determine a predicted value for at least one of the first partition and the second partition based on the determined partition pattern, and code the at least one of the first partition and the second partition based on the predicted value.

For example, when determining a partitioning pattern, video encoder 20 and/or video decoder 30 may perform one of the partitioning processes described below (e.g., partitioning in DMM, chain coding, SDC, or the like) to assign depth values to partitions of the block. Video encoder 20 and/or video decoder 30 may then determine a partitioning pattern that indicates whether the top row of depth values includes depth values assigned only to a first partition, depth values assigned only to a second partition, or depth values assigned to both the first partition and the second partition. The partitioning pattern may also indicate whether the left column of depth values includes depth values assigned only to the first partition, depth values assigned only to the second partition, or depth values assigned to both the first and second partition.

In some examples, video encoder 20 and/or video decoder 30 may determine the partitioning pattern by analyzing each partition assignment of the top row and left column of depth values. That is, video encoder 20 and/or video decoder 30 may identify a transition between a first partition and a second partition (if such a transition occurs) by determining the partition assignment of each depth value of the top row and left column of the block. In other examples, video encoder 20 and/or video decoder 30 may determine the partitioning pattern by analyzing a sub-set of depth values from the top row and left column. That is, video encoder 20 and/or video decoder 30 may identify a transition between a first partition and a second partition (if such a transition occurs) by determining the partition assignment of depth values in predetermined locations of the depth block (e.g., top left corner, top right corner, and bottom left corner).

Video encoder 20 and/or video decoder 30 may then determine a predicted value for at least one of the first partition and the second partition based on the determined partition pattern. For example, video encoder 20 and/or video decoder 30 may identify representative neighboring reference samples from which to determine predicted depth values for the first partition and/or the second partition. The neighboring reference samples that are identified may depend on the partitioning pattern.

For example, video encoder 20 and/or video decoder 30 may use different reference samples to determine a predicted value when a block includes a transition between a first partition and a second partition in the top row of depth values than when a block does not include a transition between a first partition and a second partition. Video encoder 20 and/or video decoder 30 may select representative reference samples that are not positioned near partition boundaries, which may reduce prediction errors introduced by partition boundaries. Example partitioning patterns and representative neighboring reference samples are described in greater detail with respect to FIGS. 11A-11H below.

Video encoder 20 and/or video decoder 30 may then code the at least one of the first partition and the second partition based on the predicted value. For example, video encoder 20 may generate residual depth values that include a difference between actual depth values of the block and the predicted depth value of each partition, and may include the residual depth values in an encoded bitstream. Video decoder 30 may parse residual values from an encoded bitstream, generate a predicted depth value for each partition, and combine the residual depth values with the predicted depth value to determine the actual depth values.

In this way, the techniques of this disclosure may allow video encoder 20 and/or video decoder 30 to generate a predicted DC value for depth partitions more efficiently and more accurately. For example, the techniques may reduce or eliminate the number of addition and division operations that are performed to generate a predicted DC value. In addition, the techniques may reduce the introduction of partitioning errors near partition boundaries that may lead to inaccurate predictors.

Figure 2:
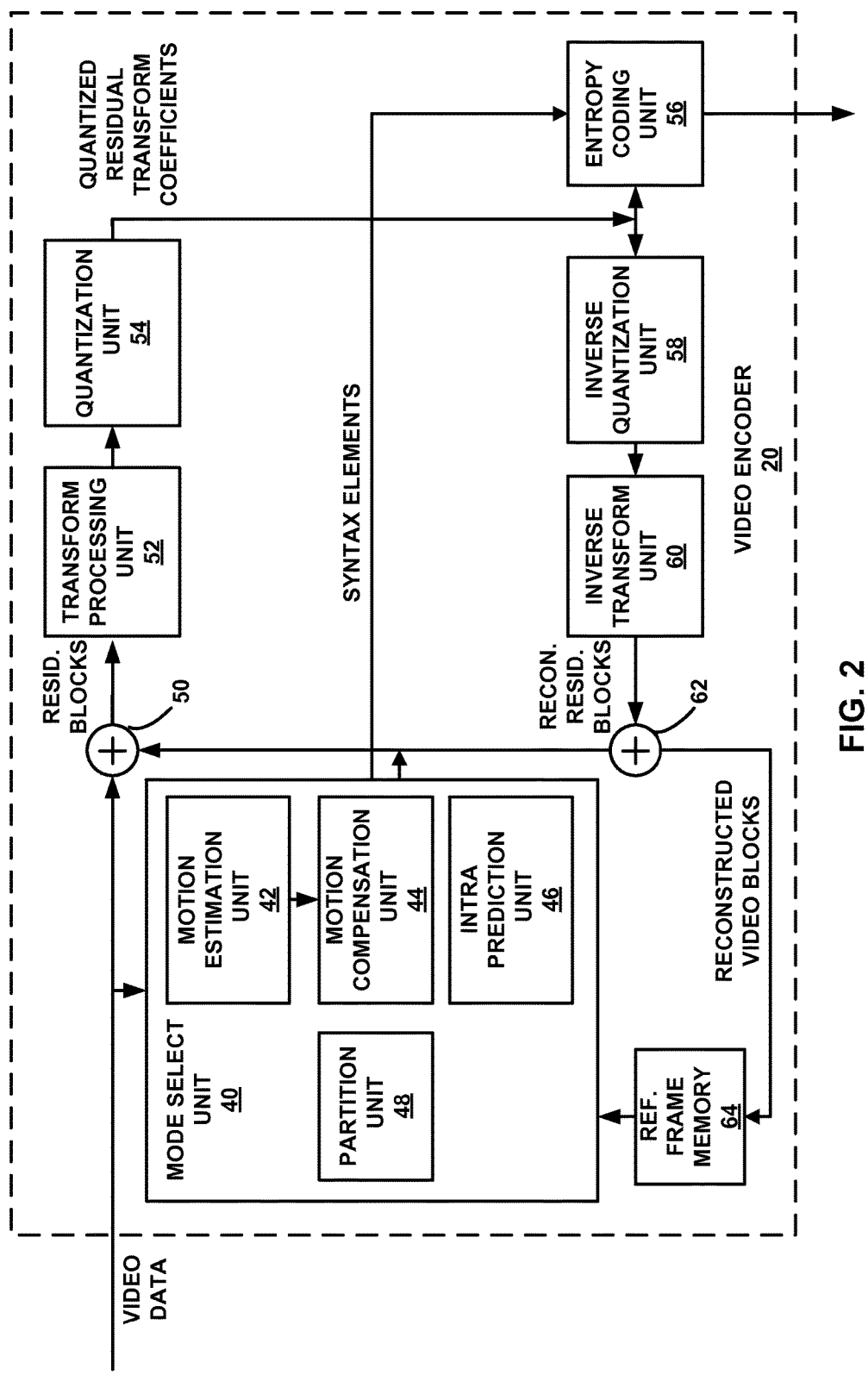
FIG. 2 is a block diagram illustrating an example of video encoder that may implement techniques for depth coding.

FIG. 2 is a block diagram illustrating an example of video encoder 20 that may implement techniques for depth coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview video coding. In some instances, video encoder 20 may be configured to code multi-view HEVC, such that each view in a time instance may be processed by a decoder, such as video decoder 30. For HEVC-3D, in addition to encoding texture maps (i.e., luma and chroma values) for each view, video encoder 20 may further encode a depth map for each view.

In any case, as shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provide the resulting intra- or inter-coded block to summer 50 to generate residual block data and to summer 62 to reconstruct the encoded block for use as a reference frame. Mode select unit 40 may also provide syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map. For example, intra-prediction unit 46 use intra-prediction modes from the base (2D) HEVC standard (as described, for example, with respect to FIG. 4 below), depth modeling modes (DMMs) (as described, for example, with respect to FIGS. 5A and 5B below), region boundary chain coding (as described, for example, with respect to FIG. 6 below), simplified depth coding (SDC) (as described, for example, with respect to FIG. 7 below) to code an intra-predicted PU of a depth slice.

In some examples, intra-prediction unit 46 may partition a depth PU into more than one region, and may intra-predict each region separately. Examples include DMMs, chain coding, SDC mode two, or the like. In such examples, intra-prediction unit 46 may generate a single, predicted DC value for each partition. The predicted DC value may be based on neighboring sample values.

According to aspects of this disclosure, intra-prediction unit 46 may determine a single predicted value for each partition of a depth PU based on a partitioning pattern of the PU. As noted above, the techniques may allow intra-prediction unit 46 to determine a predicted DC value without performing averaging operations typically associated with generating a predicted DC value.

For example, according to aspects of this disclosure, intra-prediction unit 46 may perform partitioning to assign samples of a depth PU two regions (e.g., a first partition and a second partition). Intra-prediction unit 46 may then determine a partitioning pattern that indicates whether a top row of the PU includes samples assigned only to a first partition, samples assigned only to a second partition, or samples assigned to both the first partition and the second partition. Intra-prediction unit 46 may also determine whether a left column of the PU includes samples assigned only to the first partition, samples assigned only to the second partition, or samples assigned to both the first and second partition.

In some examples, intra-prediction unit 46 may determine the partitioning pattern by analyzing each partition assignment of samples of the top row and left column of the PU. That is, intra-prediction unit 46 may identify a transition between a first partition and a second partition (if such a transition occurs) by determining the partition assignment of each sample of the top row and left column of the PU. In other examples, intra-prediction unit 46 may determine the partitioning pattern by analyzing a sub-set of samples from the top row and left column of the PU. That is, intra-prediction unit 46 may identify a transition between a first partition and a second partition (if such a transition occurs) by determining the partition assignment of samples in predetermined locations of the PU (e.g., top left corner, top right corner, and bottom left corner).

Intra-prediction unit 46 may then determine a predicted DC value for the partitions of the PU based on the determined partition pattern. For example, intra-prediction unit 46 may identify representative reference samples from one or more neighboring PUs from which to determine predicted DC values for the partitions. The neighboring reference samples that are identified may depend on the partitioning pattern.

In general, intra-prediction unit 46 may select reference samples that are not positioned near partition boundaries, which may reduce prediction errors introduced by partition boundaries. Intra-prediction unit 46 may determine a predicted DC value based on the value of a single reference sample or based on a combination of more than one reference sample. In another example, intra-prediction unit 46 may determine a predicted DC value according to a default predicted DC value, as described in greater detail below.

In any case, video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
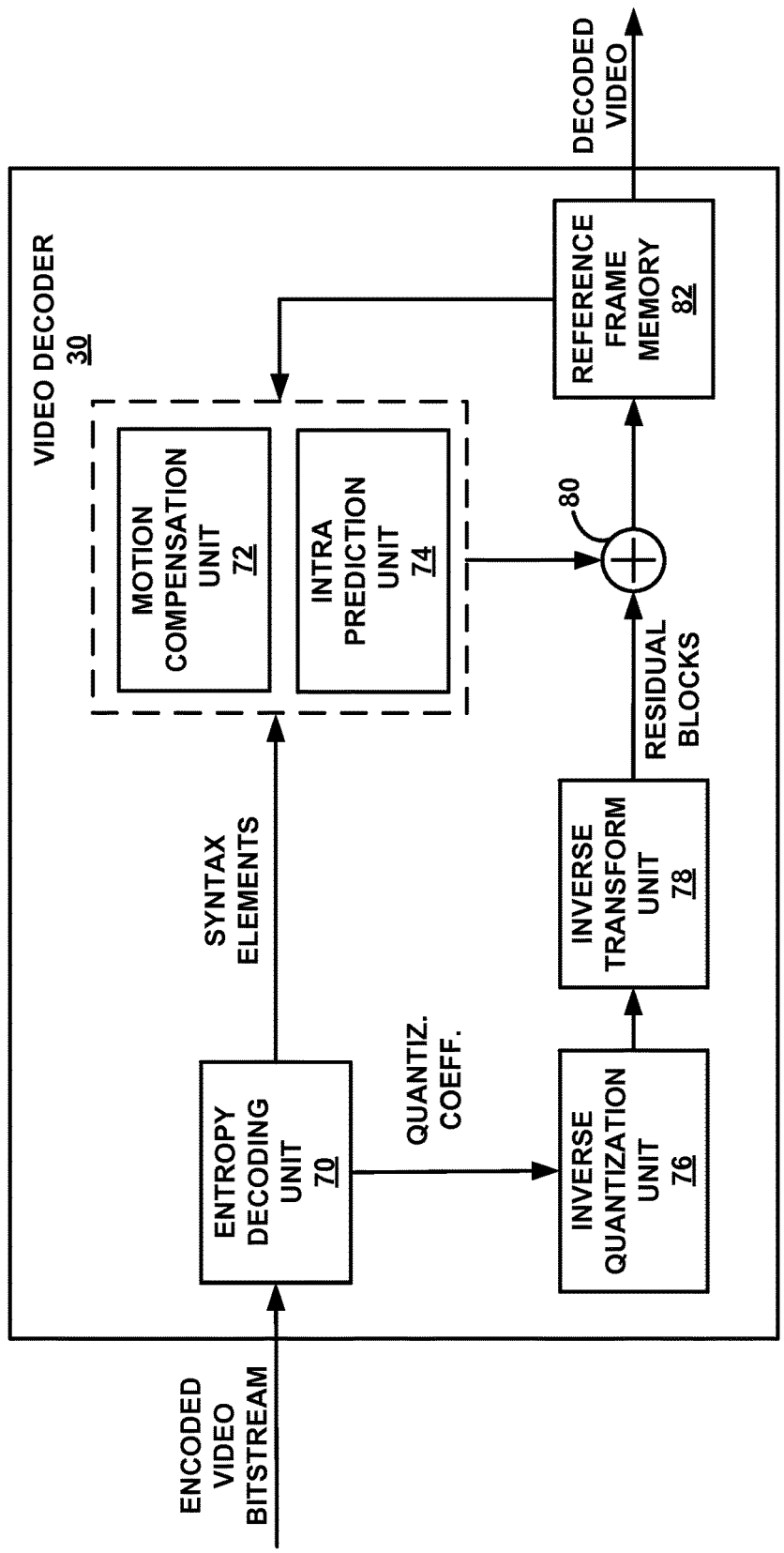
FIG. 3 is a block diagram illustrating an example of video decoder that may implement techniques for depth coding.

FIG. 3 is a block diagram illustrating an example of video decoder 30 that may implement techniques for depth coding. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

As noted above, video decoder 30 may be adapted to perform multiview video coding. In some instances, video decoder 30 may be configured to decode multi-view HEVC. For HEVC-3D, in addition to decoding texture maps (i.e., luma and chroma values) for each view, video decoder 30 may further decode a depth map for each view.

In any case, when the video slice is coded as an intra-coded (I) slice, intra-prediction unit 74 may generate prediction data for a video block of the current video slice based on a signaled intra prediction mode and data from previously decoded blocks of the current frame or picture.

Intra-prediction unit 74 may also intra-code depth data. For example, intra-prediction unit 74 use intra-prediction modes from the base (2D) HEVC standard (as described, for example, with respect to FIG. 4 below), depth modeling modes (DMMs) (as described, for example, with respect to FIGS. 5A and 5B below), region boundary chain coding (as described, for example, with respect to FIG. 6 below), simplified depth coding (SDC) (as described, for example, with respect to FIG. 7 below) to code an intra-predicted PU of a depth slice.

In some examples, intra-prediction unit 74 may partition a depth PU into more than one region, and may intra-predict each region separately. Examples include DMMs, chain coding, SDC mode two, or the like. In such examples, intra-prediction unit 74 may generate a single, predicted DC value for each partition. The predicted DC value may be based on neighboring sample values.

According to aspects of this disclosure, intra-prediction unit 74 may determine a single predicted value for each partition of a depth PU based on a partitioning pattern of the PU. As noted above, the techniques may allow intra-prediction unit 74 to determine a predicted DC value without performing averaging operations typically associated with generating a predicted DC value.

For example, according to aspects of this disclosure, intra-prediction unit 74 may perform partitioning to assign samples of a depth PU two regions (e.g., a first partition and a second partition). Intra-prediction unit 74 may then determine a partitioning pattern that indicates whether a top row of the PU includes samples assigned only to a first partition, samples assigned only to a second partition, or samples assigned to both the first partition and the second partition. Intra-prediction unit 74 may also determine whether a left column of the PU includes samples assigned only to the first partition, samples assigned only to the second partition, or samples assigned to both the first and second partition.

In some examples, intra-prediction unit 74 may determine the partitioning pattern by analyzing each partition assignment of samples of the top row and left column of the PU. That is, intra-prediction unit 74 may identify a transition between a first partition and a second partition (if such a transition occurs) by determining the partition assignment of each sample of the top row and left column of the PU. In other examples, intra-prediction unit 74 may determine the partitioning pattern by analyzing a sub-set of samples from the top row and left column of the PU. That is, intra-prediction unit 74 may identify a transition between a first partition and a second partition (if such a transition occurs) by determining the partition assignment of samples in pre-determined locations of the PU (e.g., top left corner, top right corner, and bottom left corner).

Intra-prediction unit 74 may then determine a predicted DC value for the partitions of the PU based on the determined partition pattern. For example, intra-prediction unit 74 may identify representative reference samples from one or more neighboring PUs from which to determine predicted DC values for the partitions. The neighboring reference samples that are identified may depend on the partitioning pattern.

In general, intra-prediction unit 74 may select reference samples that are not positioned near partition boundaries, which may reduce prediction errors introduced by partition boundaries. Intra-prediction unit 74 may determine a predicted DC value based on the value of a single reference sample or based on a combination of more than one reference sample. In another example, intra-prediction unit 74 may determine a predicted DC value according to a default predicted DC value, as described in greater detail below.

When the video frame is coded as an inter-coded (i.e., B (bi-directionally predicted), P (predicted from a previous frame) or GPB (generalized P or B slice)) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 or intra-prediction unit 74 generates the predictive block for the current video block (e.g., a texture block or a depth block) based on motion vectors or other syntax elements, video decoder 30 forms a decoded video block by summing the residual blocks from inverse transform unit 78 with the corresponding predictive blocks generated by motion compensation unit 82 or intra-prediction unit 74. Summer 90 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Figure 4:
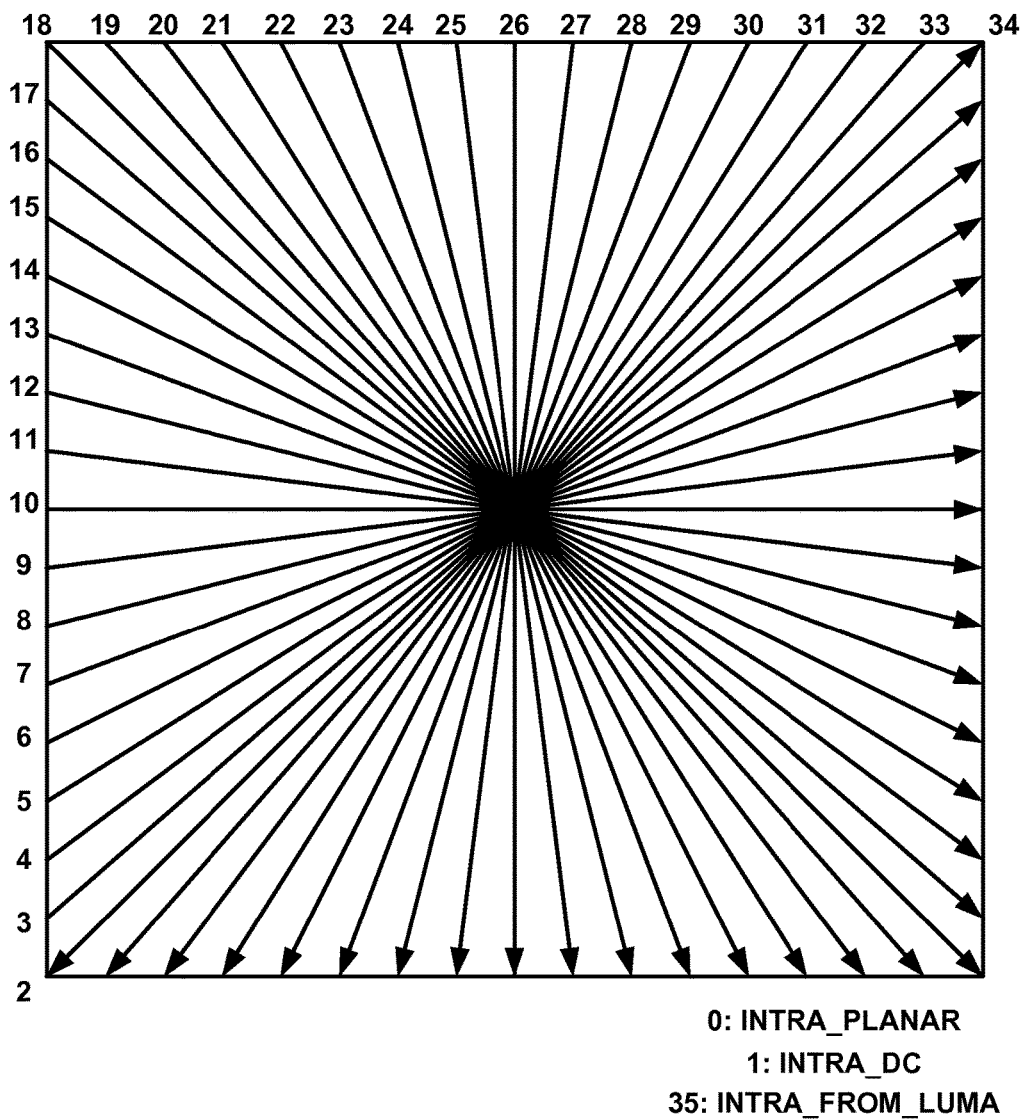
FIG. 4 generally illustrates the prediction directions associated with directional intra-prediction modes.

FIG. 4 generally illustrates the prediction directions associated with directional intra-prediction modes. For example, as noted above, the HEVC standard may include thirty five intra-prediction modes, including a planar mode (mode 0), a DC mode (mode 1) and 33 directional prediction modes (modes 2-34). With planar mode, prediction is performed using a so-called "plane" function. With DC mode (e.g., for producing a DC predicted value), prediction may be performed based on an averaging of pixel values within the block. With a directional prediction mode, prediction is performed based on a neighboring block's reconstructed pixels along a particular direction (as indicated by the mode). In general, the tail end of the arrows shown in FIG. 4 represents a relative one of neighboring pixels from which a value is retrieved, while the head of the arrows represents the direction in which the retrieved value is propagated to form a predictive block.

The intra-modes shown in FIG. 4 may be used for predicting depth values. For example, each of the angular intra-prediction modes shown in FIG. 4 may be associated with a set of Wedgelet patterns, as described in greater detail below with respect to FIGS. 5A and 5B.

Figure 5A:
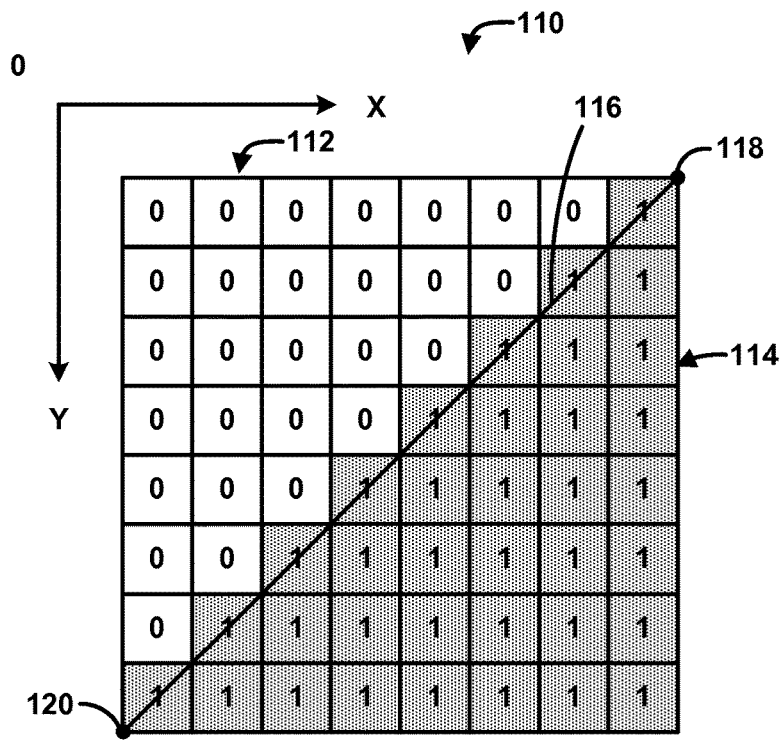
FIGS. 5A and 5B are conceptual diagrams illustrating examples of depth modeling modes (DMMs).
Figure 5B:
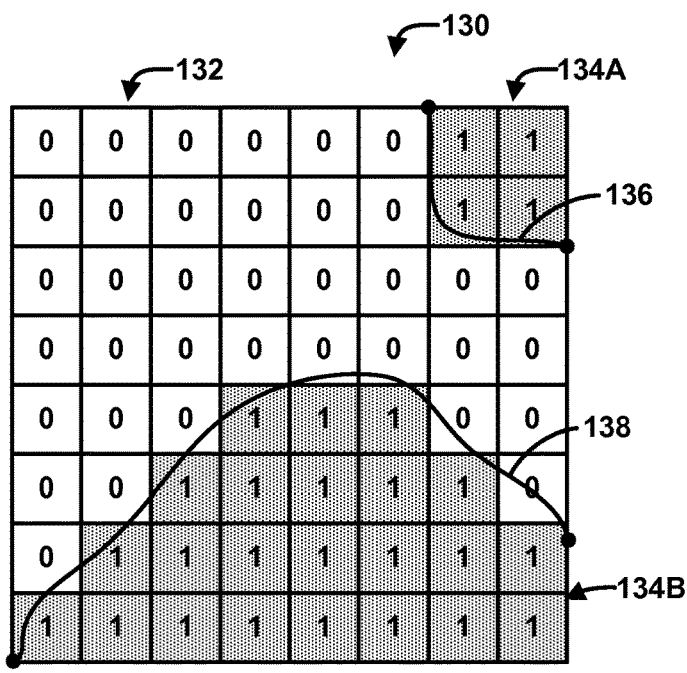

FIGS. 5A and 5B are conceptual diagrams illustrating examples of depth modeling modes (DMMs). FIG. 5A, for example, illustrates depth block 110 that is partitioned using Wedgelet partitioning, and FIG. 5B, as another example, illustrates depth block 130 that is partitioned using Contour partitioning. 3D-HEVC includes techniques for depth modeling modes (DMMs) for partitioning blocks along with the intra-prediction modes to code an intra-prediction unit of a depth slice. HTM version 3.1 applies a DMM method for intra coding of depth maps, which may better represent sharper edges in depth maps in some cases.

For example, 3D-HEVC provides four DMM modes: Mode 1 (explicit Wedgelet signaling), Mode 2 (intra-predicted Wedgelet partitioning), Mode 3 (inter-component Wedgelet partitioning), and Mode 4 (inter-component Contour partitioning). In all four modes, a video coder, such as video encoder 20 or video decoder 30, may partition a depth block into two regions specified by a DMM pattern, where each region is represented by a constant value. The DMM pattern can be either explicitly signaled (mode 1), predicted by spatially neighboring blocks (mode 2), or predicted using a co-located texture block (mode 3 and mode 4).

There are two partitioning models defined in DMM, including Wedgelet partitioning and the Contour partitioning. Again, FIG. 5A illustrates an example of Wedgelet partitioning, and FIG. 5B illustrates an example of Contour partitioning. Each individual square within depth blocks 110 and 130 represents a respective individual pixel of depth blocks 110 and 130, respectively. Numeric values within the squares represent whether the corresponding pixel belongs to region 112 (value "0" in the example of FIG. 5A) or region 114 (value "1" in the example of FIG. 5A). Shading is also used in FIG. 5A to indicate whether a pixel belongs to region 112 (white squares) or region 114 (grey shaded squares).

Each pattern (that is, both Wedgelet and Contour) may be defined by an array of size $u_B \times v_B$ binary digit labeling of whether the corresponding sample (that is, pixel) belongs to region $P_1$ or $P_2$ (where $P_1$ corresponds to region 112 in FIG. 5A and region 132 in FIG. 5B, and $P_2$ corresponds to region 114 in FIG. 5A and region 134A, 134B in FIG. 5B), where $u_B$ and $v_B$ represent the horizontal and vertical size of the current PU, respectively. In the examples of FIG. 5A and FIG. 5B, the PU corresponds to blocks 110 and 130, respectively. Video coders, such as video encoder 20 and video decoder 30, may initialize Wedgelet patterns at the beginning of coding, e.g., the beginning of encoding or the beginning of decoding.

As shown in the example of FIG. 5A, for a Wedgelet partition, depth block 110 is partitioned into two regions, region 112 and region 114, by straight line 116, with start point 118 located at (Xs, Ys) and end point 120 located at (Xe, Ye). In the example of FIG. 5A, start point 118 may be defined as point (8, 0) and end point 120 may be defined as point (0, 8).

As shown in the example of FIG. 5B, for Contour partitioning, a depth block, such as depth block 130, can be partitioned into two irregularly-shaped regions. In the example of FIG. 5B, depth block 130 is partitioned into region 132 and region 134A, 134B. Although pixels in region 134A are not immediately adjacent to pixels in region 134B, regions 134A and 134B are defined to form one single region, for the purposes of predicting a PU of depth block 130. The Contour partitioning is more flexible than the Wedgelet partitioning, but may be relatively more difficult to signal. In DMM mode 4, in the case of 3D-HEVC, Contour partitioning pattern is implicitly derived using reconstructed luma samples of the co-located texture block.

In this manner, a video coder, such as video encoder 20 and video decoder 30, may use line 116, as defined by start point 118 and end point 120, to determine whether a pixel of depth block 110 belongs to region 112 (which may also be referred to as region "P₁") or to region 114 (which may also be referred to as region "P₂"). Likewise, a video coder may use lines 136, 138 of FIG. 5B to determine whether a pixel of depth block 130 belongs to region 132 (which may also be referred to as region "P₁") or to region 134 (which may also be referred to as region "P₂"). Regions "P1" and "P2" are default naming conventions for different regions partitioned according to DMM, and thus, region P₁ of depth block 110 should not be considered the same region as region P₁ of depth block 130.

As noted above, each of the DMMs may be defined by whether the DMM uses Wedgelet or Contour partitioning, and whether the pattern is explicitly signaled or implicitly determined. The DMM process may be integrated as an alternative to the intra prediction modes specified in HEVC (shown in FIG. 4). A one bit flag may be signaled for each PU to specify whether DMM or conventional intra prediction is applied.

Aspects of this disclosure generally relate to techniques for determining a predicted DC value for one or more partitions of a depth block. For example, according to aspects of this disclosure, a video coder, such as video encoder 20 or video decoder 30, may determine a predicted DC value based on a partitioning pattern, such as the partitioning pattern defined by line 116 (FIG. 5A) or lines 136, 138 (FIG. 5B). As described in greater detail below, the position of line 118 may determine the neighboring samples from which a predicted DC value is derived for region 112 and/or region 114 (FIG. 5A). Likewise, the position of lines 136, 138 may determine the neighboring samples from which a predicted DC value is derived for region 132 and/or region 134 (FIG. 5B).

Figure 6:
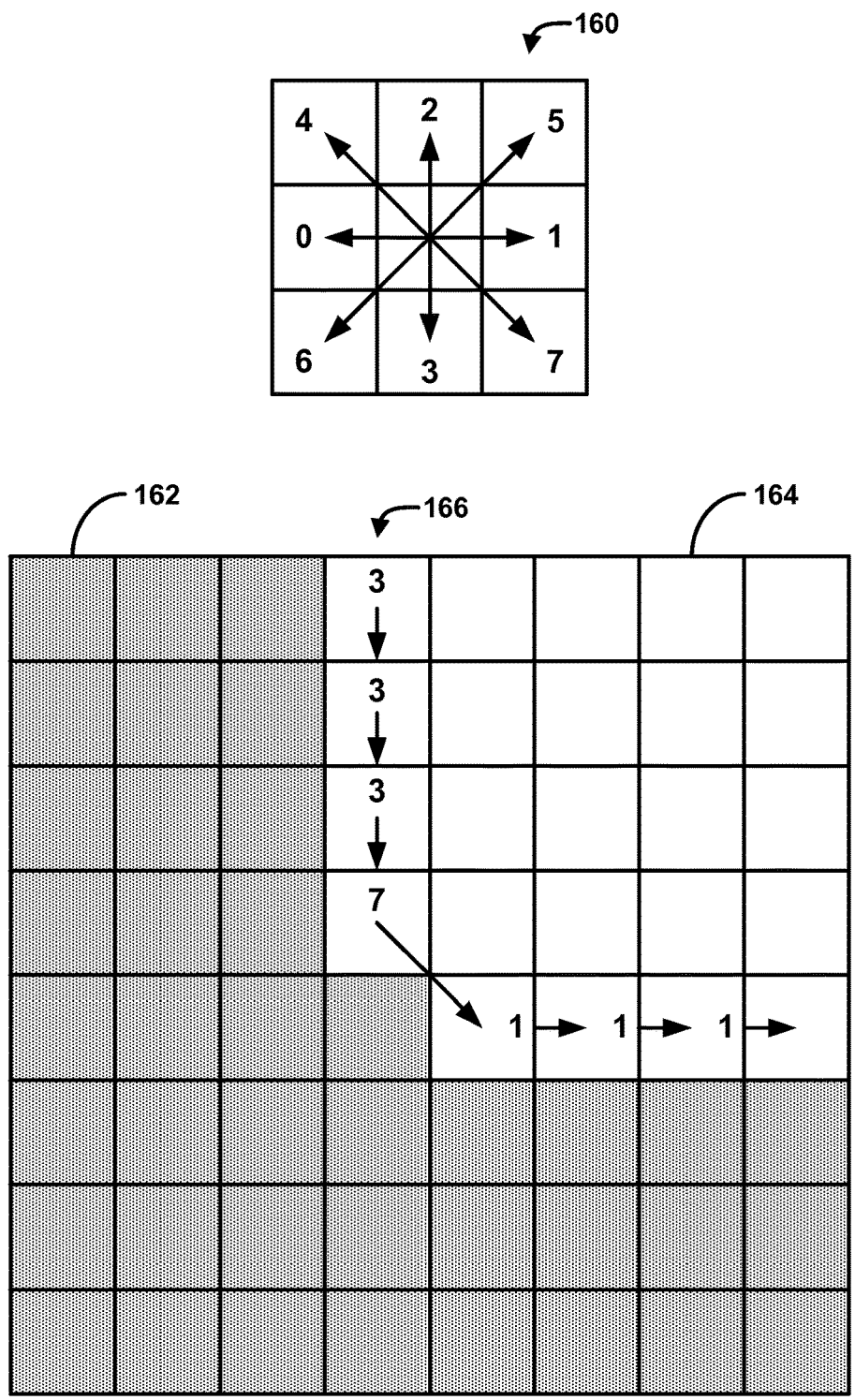
FIG. 6 is a conceptual diagram illustrating a region boundary chain coding mode.

FIG. 6 is a conceptual diagram illustrating a region boundary chain coding mode. For example, 3D-HEVC includes a region boundary chain coding mode that allows explicit signaling of partition boundaries (e.g., rather than partitioning based on co-located texture, as described above with respect to DMMs). This disclosure may refer to "region boundary chain coding mode" as "chain coding."

In general, a chain is a connection between a sample and one of its eight-connectivity samples. As shown by block 160 of FIG. 6, there are eight different chain direction types, each assigned with a direction index ranging from 0 to 7. The chain direction types may aid a video coder in determining partitions of a depth block.

For example, the example of FIG. 6 includes a first partition 162 and a second partition 164 separated by a chain 166 that indicates the partitioning structure. A video encoder (such as video encoder 20) may determine and signal chain 166 for a PU in an encoded bitstream, while a video decoder (such as video decoder 30) may parse data representing chain 166 from an encoded bitstream.

In general, chain 166 includes a starting position, an indication of a number of links in the chain (e.g., a number of chain codes), and for each chain code, a direction index. Other types of signaling for chain 166 could also be used. In one example, to signal the arbitrary partition pattern shown in the example of FIG. 6, video encoder 20 may encode one bit (e.g., 0) to indicate that chain 166 begins from the top boundary. Video encoder 20 may encode three bits (e.g., 011) to indicate that chain 166 begins after the third depth sample of the top boundary. Video encoder 20 may encode four bits (e.g., 0110) to indicate that there are 7 total links in chain 166. Video encoder 20 may also encode a series of connected chains indexes (e.g., 3, 3, 3, 7, 1, 1, 1) to indicate the direction of each chain link (e.g., in accordance with block 160). In some examples, video encoder 20 may convert each index to a code word using a look-up-table. A video decoder, such as video decoder 30, may parse the signaling described above to determine the partitioning pattern of a block. Video decoder 30 may then decode depth values for each partition.

Aspects of this disclosure generally relate to techniques for determining a predicted DC value for one or more partitions of a depth block. For example, according to aspects of this disclosure, a video coder, such as video encoder 20 or video decoder 30, may determine a predicted DC value based on a partitioning pattern, such as the partitioning pattern defined by chain 166. As described in greater detail below, the position of chain 166 may determine the neighboring samples from which a predicted DC value is derived for partition 162 and/or partition 164.

Figure 7:
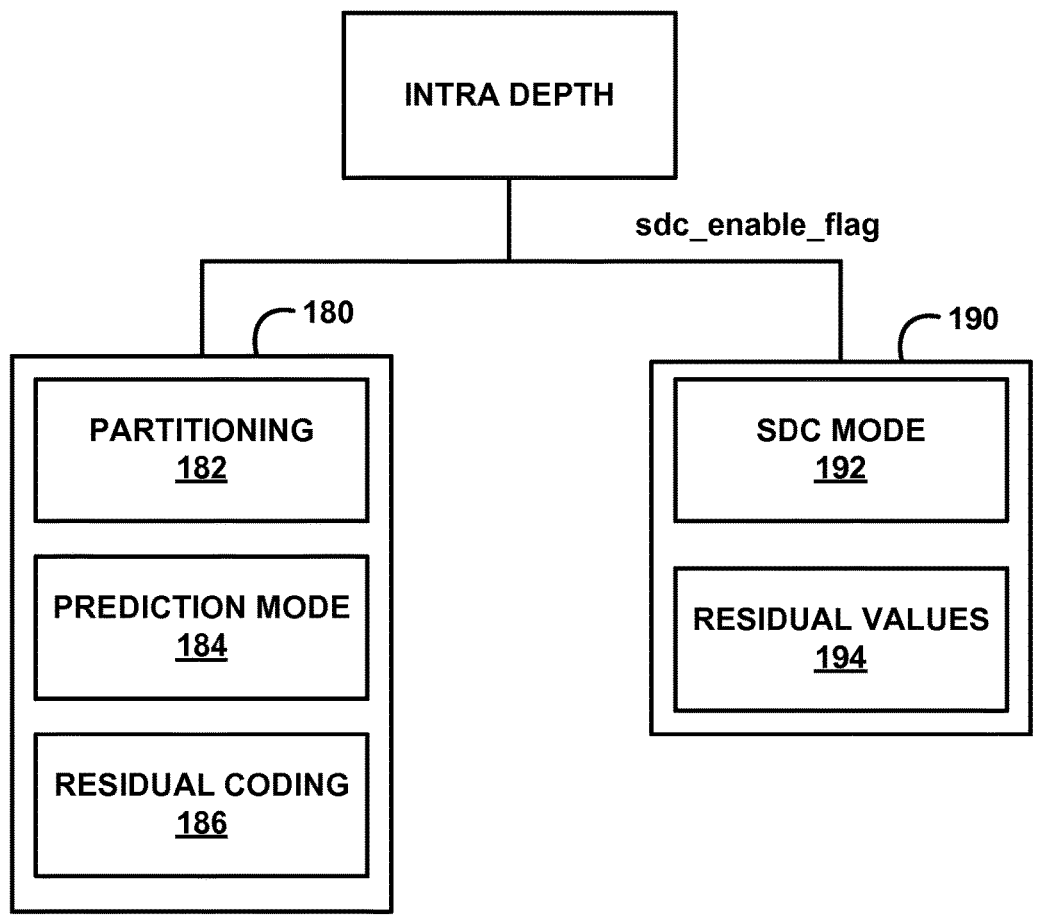
FIG. 7 is a block diagram illustrating intra-coding depth information using simplified depth coding (SDC).

FIG. 7 is a block diagram illustrating intra-coding depth information using simplified depth coding (SDC). In the example of FIG. 7, a video coder (such as video encoder 20 or video decoder 30) may use any of the intra-prediction modes described above (HEVC modes, DMMs, chain coding) to intra-predict depth information using left branch 180. In such examples, the video coder may perform partitioning (e.g., Wedgelet, Contour, chain, or the like) 182, determine a prediction mode 184 (e.g., HEVC intra-modes, DMMs, or the like), and perform residual coding 186.

Alternatively, an SDC syntax element (e.g., a sdc_enable_flag) may indicate SDC coding according to right branch 190. For example, when implementing SDC, the video coder may determine an SDC sub-mode 192 and directly code residual values 194 (e.g., without transformation and quantization).

In some instances, SDC may only be applied for a 2N×2N PU partition size. As noted above, instead of coded quantized transform coefficients, SDC modes represent a depth block based on a type of partition of the current depth block (e.g., DC (1 partition), DMM mode 1 (2 partitions), DMM mode 2 (2 partitions), or planar (1 partition). In addition, as noted above, a residual value in the pixel domain is provided for each partition.

Accordingly, four sub-modes may be defined in SDC, including SDC mode 1, SDC mode 2, SDC mode 3 and SDC mode 4, which correspond to the partition type of DC, DMM mode 1, DMM mode 2 and planar, respectively. In some instances, depth values may be optionally mapped to indexes using a Depth Lookup Table (DLT), which may constructed by analyzing the frames within the first intra period before encoding the full sequence. If DLT is used, the entire DLT is transmitted to decoder in sequence parameter set, and decoded index values are mapped back to depth values based on the DLT.

In any case, aspects of this disclosure generally relate to techniques for determining a predicted DC value for one or more partitions of a depth block. For example, according to aspects of this disclosure, a video coder, such as video encoder 20 or video decoder 30, may determine a predicted DC value based on a partitioning pattern, such as the partitioning pattern defined according to SDC mode 2 (e.g., DMM mode 1 having two partitions). As described in greater detail below, partitioning structure used in SDC mode 2 may determine the neighboring samples from which a predicted DC value is derived for each partition.

Figure 8:
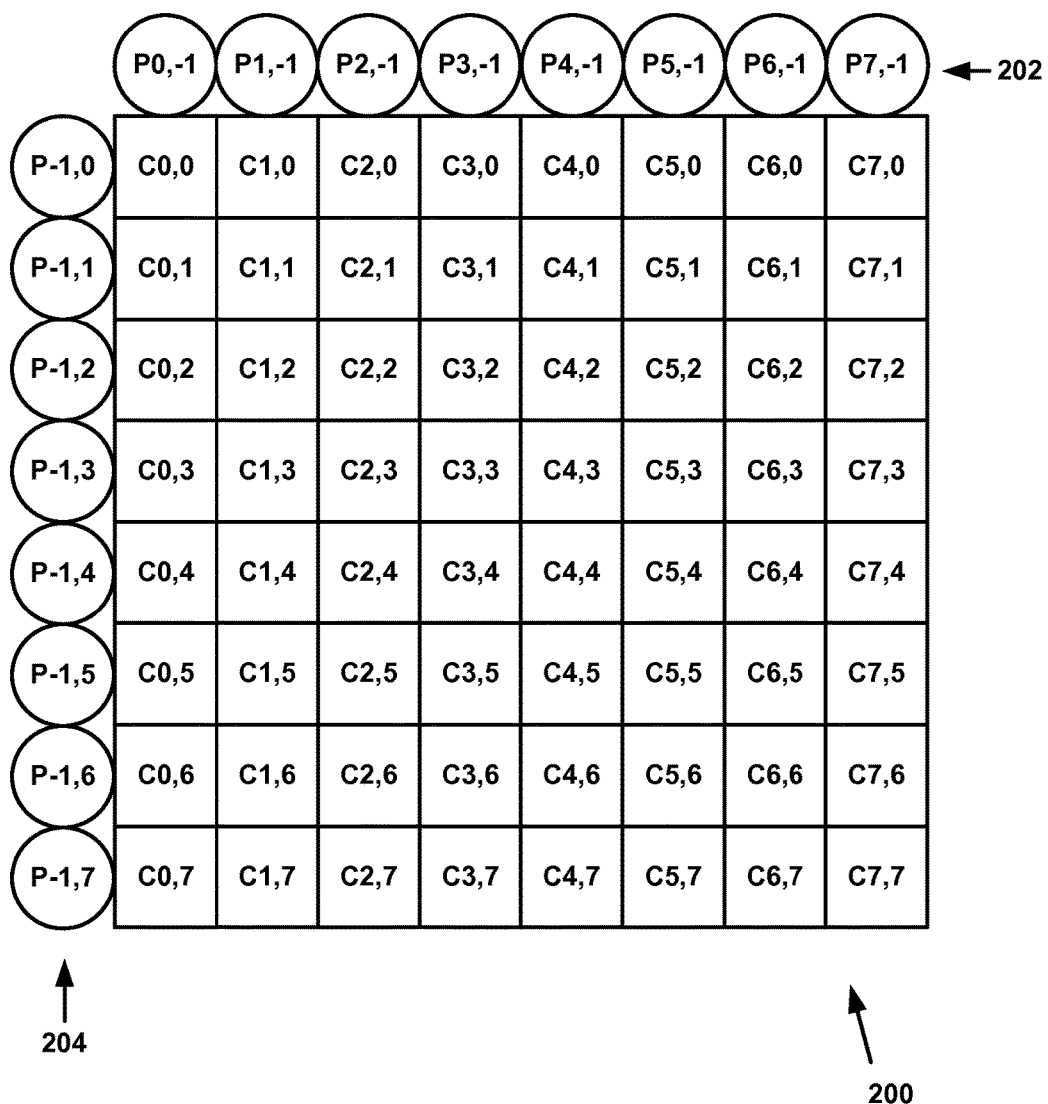
FIG. 8 is a block diagram illustrating a block of depth data and neighboring samples, which may be used to determine a predicted depth value for one or more partitions of the block.

FIG. 8 is a block diagram illustrating a block of depth data and neighboring samples, which may be used to determine a predicted depth value for one or more partitions of the block. For example, as described above, with DMM, chain coding, SDC mode 2, or the like, a video coder (such as video encoder 20 or video decoder 30) may partition a depth PU into to regions based on a specific partition pattern. In addition, the video coder may predict each partition using a single value, e.g., a predicted DC value, which may be derived from one or more neighboring reference samples.

In the example of FIG. 8, an 8×8 depth block 200 with samples $c_{i,j}$, where i,j=0, 1, . . . , 7 (C0,0 to C7,7) is bordered by a top row of neighboring samples 202 (P0,−1 to P7,−1) and a left column of neighboring samples 204 (P−1,0 to P−1,7) (i.e., $p_{i,j}$, where i=−1,j=−1 . . . 7 and i=0 . . . 7,j=−1) from which the video coder may derive a DC predicted depth value. The video coder may typically average all of neighboring samples 202 and 204 when determining a predicted DC value.

In an example for purposes of illustration, assume a depth value is represented with a B-bit representation. For example, when B is 8, a depth value may range from 0 to 255. In addition, assume that depth block 200 (e.g., an N×N block composed of binary values) has been partitioned into a given partition pattern, i.e., $bPattern_{x,y}$, where x=0 . . . N−1, y=0 . . . N−1. For the assumptions provided above, the video coder may typically execute the following steps to derive a predicted DC value for each partition of the given partition pattern, i.e., $DC_0$ and $DC_1$:

1. Set $DC_0$ and $DC_1$ as $2^{B-1}$, set variables $S_0$, $S_1$, $N_0$ and $N_1$ equal to zero.
2. For i=0 . . . N−1, the following applies:
   i. If $bPattern_{i,0}$ equal to 0, set $S_0$ as $S_0+p_{i,-1}$ and set $N_0$ as $N_0+1$;
   ii. Otherwise, set $S_1$ as $S_1+p_{i,-1}$ and set $N_1$ as $N_1+1$;
3. For i=0 . . . N−1, the following applies:
   i. If $bPattern_{0,i}$ equal to 0, set $S_0$ as $S_0+p_{-1,i}$ and set $N_0$ as $N_0+1$;
   ii. Otherwise, set $S_1$ as $S_1+p_{-1,i}$ and set $N_1$ as $N_1+1$;
4. If $N_0$ is not zero, set $DC_0$ as $$\frac{S_0}{N_0};$$

If $N_1$ is not zero, set $DC_1$ as $$\frac{S_1}{N_1}.$$

Accordingly, in this example, after determining the partition pattern and the predicted DC values are derived, the video coder may generate a prediction block by setting the samples located in partition 0 and partition 1 of the block as $DC_0$ and $DC_1$, respectively.

In the example above, the video coder initially sets both predicted DC values to a predetermined default value, and initializes a set of variables for the predicted value derivation. Then, for each sample of the top row of depth block 200 (C0,0 to C7,0), the video coder determines whether the sample belongs to the first partition (0) or the second partition.

If a sample of depth block 200 belongs to the first partition, the video coder adds the neighboring reference sample (e.g., (P0,−1) for the first sample) to the first partition sum ($S_0$), and increases a count of contributors to the first partition ($N_0$). Otherwise, if a sample of depth block 200 belongs to the second partition, the video coder adds the neighboring reference sample (e.g., (P0,−1) for the first sample) to the second partition sum ($S_1$), and increases a count of contributors to the second partition ($N_1$). The video coder repeats this process for each sample of the left column of the depth block 200 (C0,0 to C0,7).

If each partition has at least one contributing value from neighboring reference samples, the video coder may determine the DC predicted value by averaging the contributing neighboring samples (e.g., $S_0$ divided by $N_0$ and $S_1$ divided by $N_1$). If there are no contributors to a partition, the DC predicted value may remain the initial default value.

The video coder can then generate a prediction block by setting samples of the prediction block located in partition 0 and partition 1 of the prediction block as $DC_0$ and $DC_1$, respectively. That is, the video coder can set all samples of a first partition of the prediction block to the predicted DC value $DC_0$ and all samples of the second partition of the prediction block to the predicted DC value $DC_1$. The video coder may use the prediction block to generate residual samples of depth block 200, as described above.

In the example described above, there are a number of mathematical operations associated with generating a predicted DC value. For example, each contributing neighboring sample must be added to determine the average value. In addition, each contributing neighboring sample must be counted to determine the average value. In addition, a division operation is needed to determine the average value. In addition, there is division operation associated with determining an average value, which is complex for both a video encoder and decoder.

Moreover, the number of operations to be carried out increases with the size of the depth block. For example, a video coder executes 64 additions to calculate the sum of reference samples belonging to each partition for a 32×32 block. The video coder also executes 64 additions to count the number of reference samples belonging to each partition.

As described in greater herein, aspects of this disclosure relate to techniques determining a DC predicted value based on a partitioning pattern, which may reduce the number of operations performed by the video coder when determining the DC predicted value. For example, rather than determining DC predicted values for partitions according to the averaging process described above with respect to FIG. 8, a video coder (such as video encoder 20 or video decoder 30) may determine a DC predicted value by identifying representative neighboring samples based on a determined prediction pattern.

Figure 9A:
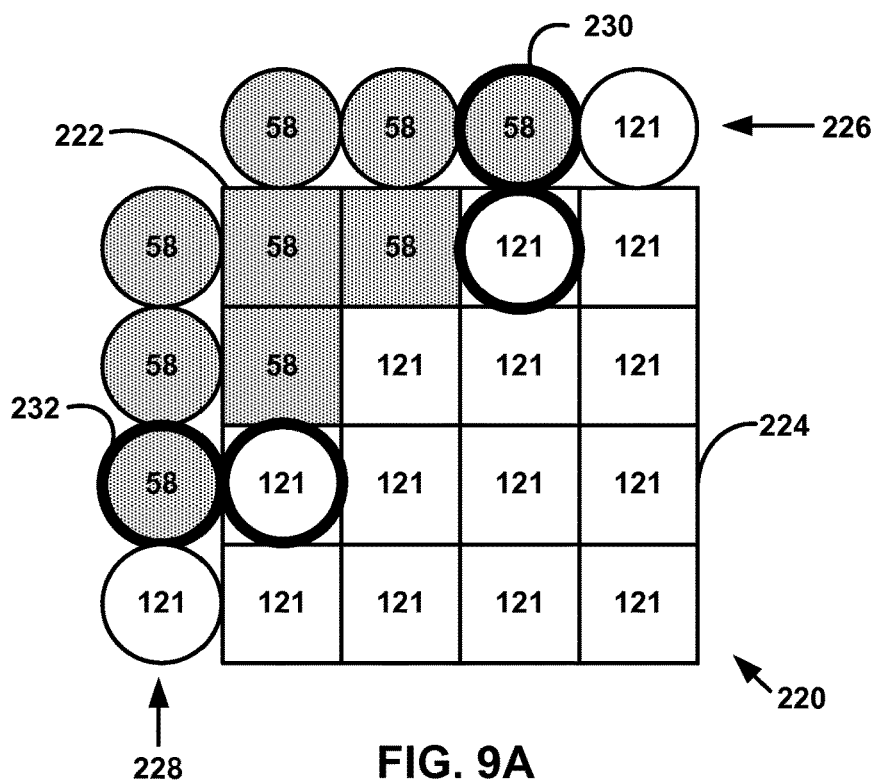
FIG. 9A is a block diagram illustrating depth values of a block having a first partition and a second partition and values of neighboring samples.
Figure 9B:
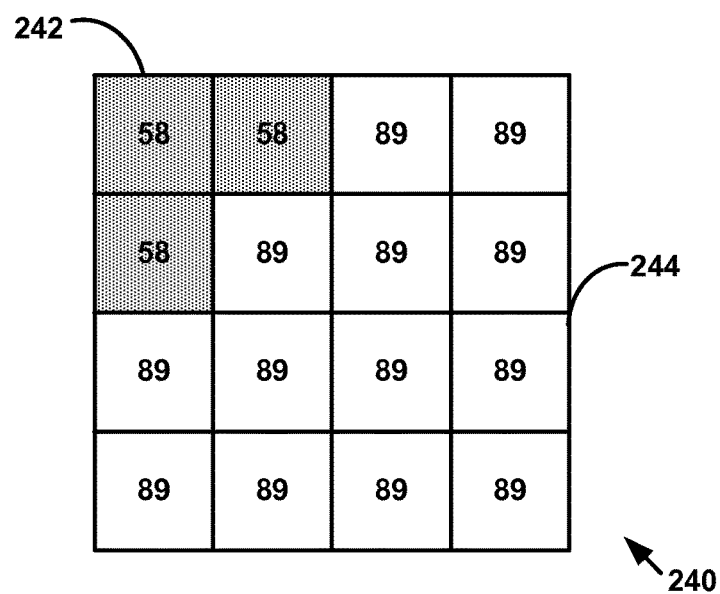
FIG. 9B is a block diagram illustrating predicted depth values for the first partition and the second partition of the block shown in FIG. 9A.

FIGS. 9A and 9B generally illustrate techniques that determine a prediction block of DC predicted values for coding a block of depth values based on an averaging of neighboring samples. The example of FIGS. 9A and 9B illustrates how neighboring samples near a partition boundary may distort the values of the prediction block.

For example, FIG. 9A is a block diagram illustrating a depth block 220 having a first partition 222 (depth values 58, shaded gray) and a second partition 224 (depth values 121). FIG. 9A also includes a top row of neighboring samples 226 and a left column of neighboring samples 228.

As shown in FIG. 9A, neighboring sample values near boundary between first partition 222 and second partition 224 do not match the depth values of block 220. For example, neighboring sample 230 of samples 226 (depth value 58) does not match the corresponding depth value of block 220 (depth value 121). Likewise, neighboring sample 232 of samples 228 (depth value 58) does not match the corresponding depth value of block 220 (depth value 121).

In this example, using the averaging process described above with respect to FIG. 8 to determine a DC predicted value may introduce prediction error. For example, because the sample in the top row of block 220 adjacent to sample 230 is included in second partition 224, the video coder counts sample 230 toward the average value for second partition 224 (despite that the value of sample 232 aligns with first partition 222). Likewise, because the sample in the left column of block 220 adjacent to sample 232 is included in second partition 224, the video coder also counts sample 232 toward the average value for second partition 224 (despite that the value of sample 232 aligns with first partition 222).

FIG. 9B is a block diagram illustrating a prediction block 240 having a first DC predicted value 242 and a second DC predicted value 244 that correspond to first partition 222 and second partition 224, respectively, of depth block 220 shown in FIG. 9A. As shown in FIG. 9B, samples 230 and 232 near the partition boundary introduce a relatively large prediction error. For example, samples 230 and 232 are partitioned inaccurately, which results in $DC_0$ and $DC_1$ values of 58 and 89 (rather than 58 and 121). Such prediction error may impact coding efficiency.

Again, aspects of this disclosure relate to techniques for determining a DC predicted value based on a partitioning pattern, which may reduce introduction of partitioning errors. For example, rather than determining DC predicted values for partitions according to the averaging process described above with respect to FIG. 8, a video coder (such as video encoder 20 or video decoder 30) may determine a DC predicted value by identifying representative neighboring samples based on a determined prediction pattern. The video coder may reduce the introduction of partitioning errors near edge boundaries by selecting one or more representative neighboring samples located away from the partition boundaries.

FIG. 10 is a block diagram illustrating a block of depth data and neighboring samples, which may be used to determine a predicted depth value for one or more partitions of the block, according to aspects of this disclosure. For example, as described above, with DMM, chain coding, SDC mode 2, or the like, a video coder (such as video encoder 20 or video decoder 30) may partition a depth PU into two regions based on a specific partition pattern. In addition, the video coder may predict each partition using a single value, e.g., a predicted DC value, which may be derived from one or more neighboring reference samples.

In the example of FIG. 10, an 8×8 depth block 260 with samples $c_{i,j}$, where i, j=0, 1, . . . , 7 (C0,0 to C7,7) is bordered by a top row of neighboring samples 262 (pT0 to pT7) and a left column of neighboring samples 264 (pL0 to pL7) from which the video coder may derive a DC predicted depth value. Depth block 260 may correspond to an N×N prediction unit PU in a coded depth image having a partition pattern P that splits the PU into two separately predicted regions (e.g., each region having a separate predictor).

According to aspects of this disclosure, instead of using all samples from top row 262 and left column 264 (i.e., $pL_i$ and $pT_j$, respectively, with i including 0 . . . N−1 and j including 0 . . . N−1) as described with respect to FIG. 8, a video coder, such as video encoder 20 or video decoder 30, may select several neighboring reference samples from top row 262 and left column 264 to calculate DC values for partitions of the PU.

In some instances, the video coder may only select reference samples that include the starting and ending samples of top row 262 and/or left column 264 to determine a DC predicted value. For example, with respect to top row 262, the video coder may select reference samples $pT_0$ and $pL_{N-1}$ (e.g., pT0 and pT7 in the example of FIG. 10) to determine a DC predicted value. With respect to the left column 264, the video coder may select reference samples $pL_0$ and $pL_{N-1}$ (e.g., pL0 and pL7 in the example of FIG. 10) to determine a DC predicted value.

In some instances, the video coder additionally or alternatively select up to two neighboring reference samples (inclusive) toward the relative center of top row 262 and/or left column 264 to determine a DC predicted value. For example, the video coder may select reference samples $pT_X$ or $pL_X$ with x equal to (N−1)>>1, or x equal to N>>1 to determine a DC predicted value.

Figure 11A:
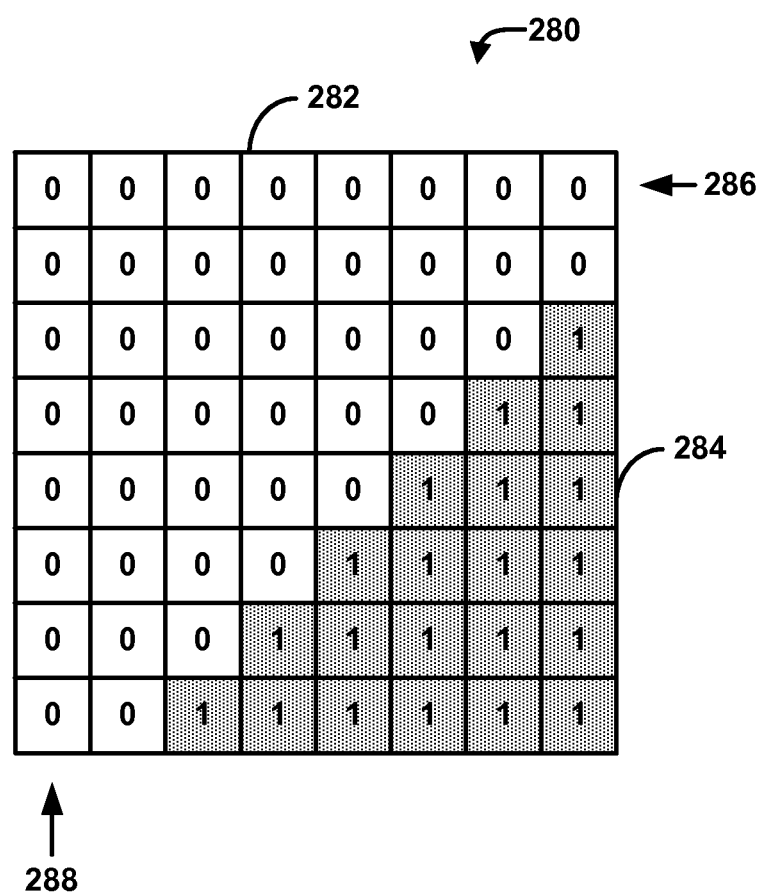
FIGS. 11A-11H are block diagrams illustrating example partition patterns a block of depth data and neighboring samples from which to determine a predicted depth value, according to aspects of this disclosure.

The video coder may select the appropriate neighboring reference samples for determining a DC predicted value based on the partitioning pattern P. In an example for purposes of illustration, if a partition does not contain any samples in the top row of block 260 (none of C0,0 to C7,0 are assigned to the partition) and does not contain any samples in the left column of block 260 (none of C0,0 to C0,7 are assigned to the partition), e.g., described herein as pattern 0, as shown in FIG. 11A below, the video coder may not select any reference samples from top row 262 or left column 264 to determine a DC predicted value for the partition. Rather, the video coder may assign the partition a default predictor, e.g., $2^{B-1}$ with B equal to the number of bits used to represent the depth values of block 260. For example, for a typical 8 bit representation, the video coder may assign a default value of 128 to the partition.

Figure 11B:
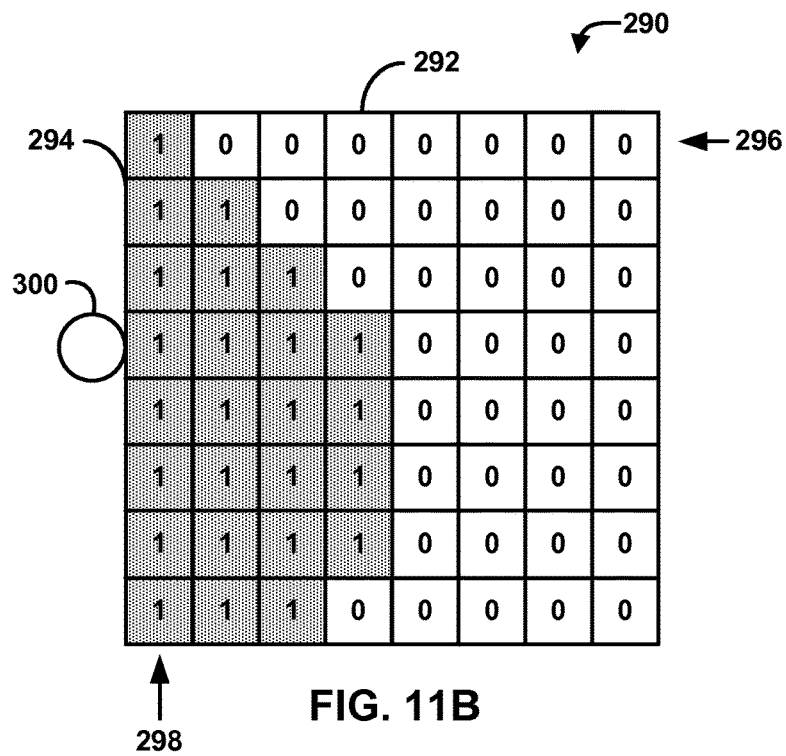
Figure 11C:
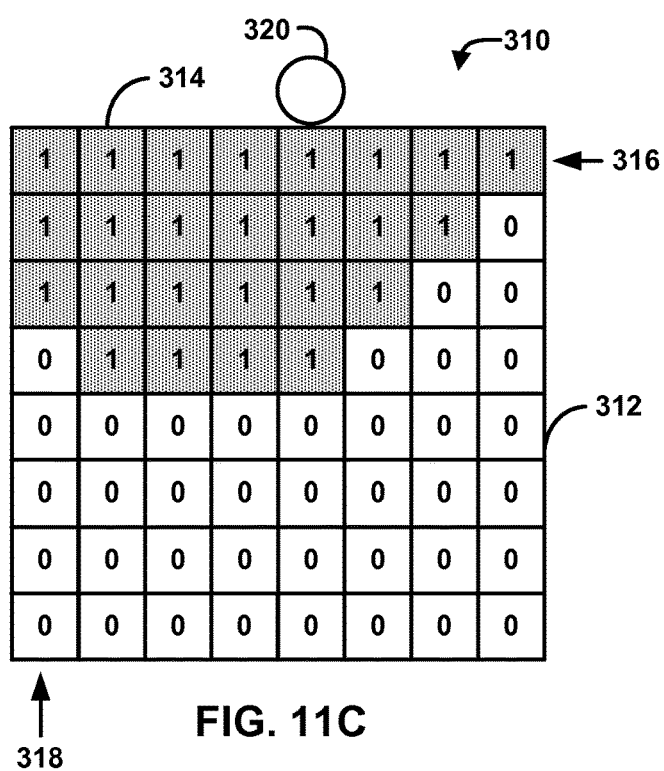

In another example for purposes of illustration, if a partition contains all samples of the top row of block 260 (all of C0,0 to C7,0 are assigned to the partition) and one or more of the samples of the left column of block 260 (one or more of C0,0 to C0,7 are assigned to the partition), e.g., described herein as pattern 1, as shown in FIG. 11C below, the video coder may select one reference sample from the relative center of neighboring sample row 262 as a representative value for the partition. For example, the video coder may select sample $pT_X$ with x equal to (N−1)>>1, or x equal to N>>1 as the representative sample.

In this example, the video coder may set the DC predicted value for the partition equal to the selected representative sample. Because all of the samples are assigned to the same partition and therefore have the same or a similar value, a majority of the neighboring reference samples should also have the same or a similar depth value (e.g., due to the characteristics typically associated with depth maps, such as areas of constant depth values, as described above). By assuming that the neighboring reference samples have the same (or a similar) value, the video coder does not need to perform any additional averaging operations, as described with respect to FIG. 8. Rather, the video coder may determine the DC predicted value using a single neighboring reference sample.

Moreover, selecting a single neighboring reference sample (or a relatively small number of neighboring reference samples, as described below) may provide a more accurate DC predicted value than the averaging process described above. For example, in the pattern 1 example described above, the video coder may select a central neighboring reference sample from which to derive the DC predicted value in order to avoid partition boundaries. Using a single neighboring reference sample eliminates the possibility of including an inaccurately partitioned neighboring reference sample, as described above with respect to FIGS. 9A and 9B.

Additional partition patterns and respective representative neighboring samples for determining a DC predicted value are shown in FIGS. 11A-11G below. After determining the DC predicted value for each partition, the video coder may code block 260 using the DC predicted values. For example, at an encoder (such as video encoder 20) a residual may be determined based on a difference between the actual sample values of block 260 and the DC predicted values for the respective partitions. At a decoder (such as video decoder 30) a residual may be combined with the DC predicted values for the respective partitions to reconstruct the actual values for block 260.

The examples described above generally include a process of checking a partition assignment of each sample of the top row of block 260 and each sample of the left column of block 260 to identify transitions between a first partition (e.g., partition 0) to a second partition (e.g., partition 1). According to other aspects of this disclosure, the video coder may check a sub-set of partition assignments to identify a transition between partitions in the top row of block 260 and the left column of block 260. For example, according to aspects of this disclosure, the video coder may determine a partition pattern based on three samples of block 260. In this example, the video coder may identify the partition assignment of the top left sample of block 260 (C0,0), the partition assignment of the top right sample of block 260 (C7,0), and the partition assignment of the bottom left sample of block 260 (C0,7). In other examples, the video coder may identify partition assignments of other samples of block 260.

In the example described above, if the top left sample of block 260 (C0,0) is assigned to a different partition that the top right sample of block 260 (C7,0), the video coder may identify a partition transition along the top row of depth samples. That is, the video coder may identify that at least one sample of the top row of block 260 is assigned to a first partition and at least one sample of the top row of block 260 is assigned to a second partition. Likewise, if the top left sample of block 260 (C0,0) is assigned to a different partition that the bottom left sample of block 260 (C0,7), the video coder may identify a partition transition along the top row of depth samples. That is, the video coder may identify that at least one sample of the left column of block 260 is assigned to a first partition and at least one of the sample of the top row of block 260 is assigned to a second partition.

The video coder may use the information above to determine a partition pattern for block 260. It is not necessary, however, to determine the precise location at which a partition transition occurs (e.g., the location of a partition boundary). Rather, as noted above, the location of the representative neighboring samples are selected to avoid partition boundaries. Accordingly, the video coder may determine a partition pattern and identify representative neighboring samples for DC predicted values without determining the precise location of a partition transition.

The techniques described above may be performed for any depth block that is partitioned according to a partitioning scheme. For example, the techniques may be used in conjunction with DMM modes, chain coding, SDC mode 2, or the like.

In some examples, the video coder may determine the number of neighboring reference samples that are selected for determining the DC predicted value of a partition based on the partition of the block. For example, as described below with respect to FIGS. 11A-11G, for one partition pattern may the video coder may identify a single representative neighboring reference sample from which to determine the DC predicted value. For another partition pattern the video coder may identify more than one representative neighboring reference sample from which to determine the DC predicted value.

Accordingly, the number of neighboring reference samples from which to determine a DC predicted value may be variable. For example, the video coder may select $2^L$ (where L is larger than 0) neighboring reference samples when determining a DC predicted value (e.g., 1, 2, 4, or the like). The number and positions of the selected neighboring reference samples for DC calculations may, in some examples, depend on PU size or other characteristics of block 260.

FIGS. 11A-11H are block diagrams illustrating example partition patterns for blocks of depth data and neighboring reference samples from which to determine a predicted depth value, according to aspects of this disclosure. In general, FIGS. 11A-11H are described from the perspective of a second partition (as shown with shaded "1" blocks) to determining a partition pattern and generating a DC predicted value. It should be understood that the same techniques may be applied to determine a partition pattern and generate DC predicted value from the perspective of a first partition (as shown with un-shaded "0" blocks).

FIG. 11A generally illustrates a depth block 280 having a first partition 282 and a second partition 284. The partition pattern shown in FIG. 11A may generally be referred to as pattern 0. In this example, second partition 284 (the partition for which a DC predicted value is being generated) does not include any samples in a top row 286 or left column 288 of block 280. That is, the bottom right sample of block 280 is assigned to a different partition (second partition 284) than a partition containing the top left, top right and bottom left samples (first partition 282).

Upon identifying pattern 0, a video coder (such as video encoder 20 or video decoder 30) may determine a DC predicted value for second partition 284 based on a predetermined, default value. For example, because none of the neighboring reference samples border second partition 284, the video coder may determine a DC predicted value for second partition 284 that does not depend on the neighboring reference samples. In some examples, the video coder may set a default DC predicted value equal to $2^{B-1}$, with B equal to the number of bits used to represent the depth values in block 280. In other examples, the video coder may set a different default DC predicted value.

FIG. 11B generally illustrates a depth block 290 having a first partition 292 and a second partition 294. The partition pattern shown in FIG. 11B may generally be referred to as pattern 1. In this example, second partition 294 (the partition for which a DC predicted value is being generated) includes at least one sample of top row 296 and all of the samples of left column 298 of block 290. The top left sample and bottom left sample of block 280 are assigned to a different partition (second partition 284) than a partition containing the top right sample (first partition 292).

Upon identifying pattern 1, a video coder (such as video encoder 20 or video decoder 30) may determine a DC predicted value for second partition 294 based on a representative neighboring sample 300 positioned near the center of left column 298. For example, as noted above with respect to FIG. 10, the video coder may select a central sample $pL_X$ with x equal to (N−1)>>1, or x equal to N>>1, where N is the number of samples of left column 298. Selecting a central sample of left column 298 may help to ensure that the representative sample is not positioned near a partition boundary, which may increase prediction accuracy, as described above. After selecting neighboring sample 300, the video coder may set the DC predicted value for second partition 294 to the value of neighboring sample 300.

FIG. 11C generally illustrates a depth block 310 having a first partition 312 and a second partition 314. The partition pattern shown in FIG. 11C is a second example of pattern 1. In this example, second partition 314 (the partition for which a DC predicted value is being generated) includes all samples of top row 316 and at least one sample of left column 318 of block 310. The top left sample and top right sample of block 310 are assigned to a different partition (second partition 314) than a partition containing the bottom left sample (first partition 312).

Upon identifying pattern 1, a video coder (such as video encoder 20 or video decoder 30) may determine a DC predicted value for second partition 314 based on a representative neighboring sample 320 positioned near the center of top row 316. For example, as noted above with respect to FIG. 10, the video coder may select a central sample $pT_X$ with x equal to (N−1)>>1, or x equal to N>>1, where N is the number of samples of top row 316. Selecting a central sample of top row 316 may help to ensure that the representative sample is not positioned near a partition boundary, which may increase prediction accuracy, as described above. After selecting neighboring sample 320, the video coder may set the DC predicted value for second partition 314 to the value of neighboring sample 320.

Figure 11D:
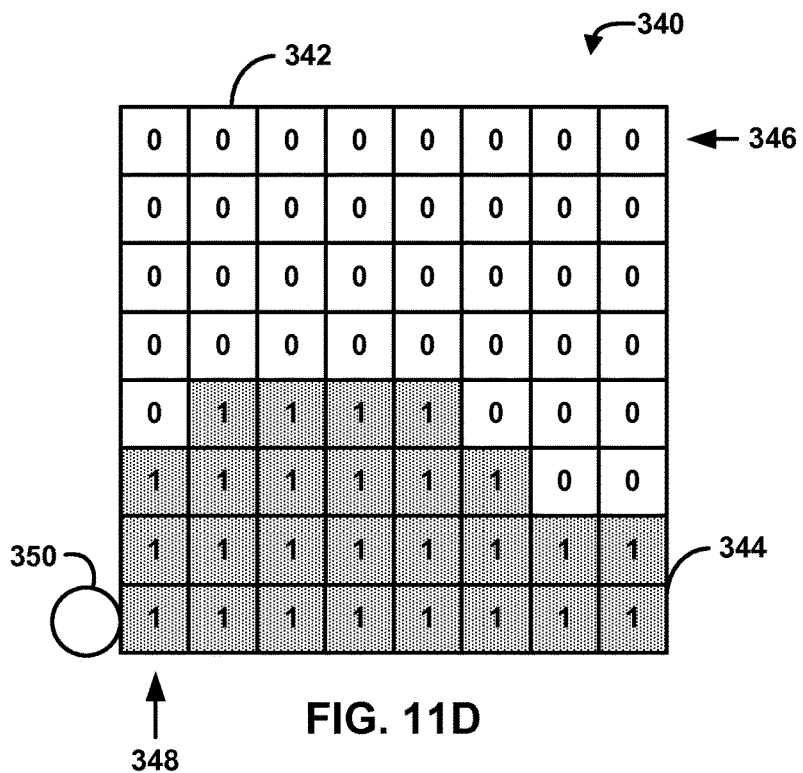

FIG. 11D generally illustrates a depth block 340 having a first partition 342 and a second partition 344. The partition pattern shown in FIG. 11D may generally be referred to as pattern 2. In this example, second partition 344 (the partition for which a DC predicted value is being generated) does not include any samples of top row 346 and includes at least one sample of left column 348 of block 340. The top left sample and top right sample of block 340 are assigned to a different partition (first partition 342) than a partition containing the bottom left sample (second partition 344).

Upon identifying pattern 2, a video coder (such as video encoder 20 or video decoder 30) may determine a DC predicted value for second partition 344 based on a representative neighboring sample 350 positioned at the bottom of left column 348 (i.e., adjacent to the bottom left corner sample of block 340). That is, the video coder may select the final sample in left column 348 as the representative neighboring sample for second partition 344. Selecting the final sample of left column 348 may help to ensure that the representative sample is not positioned near the transition between first partition 342 and second partition 344 along left column 348. As noted above, selecting samples that are positioned away from partition boundaries may increase prediction accuracy. After selecting neighboring sample 350, the video coder may set the DC predicted value for second partition 344 to the value of neighboring sample 350.

Figure 11E:
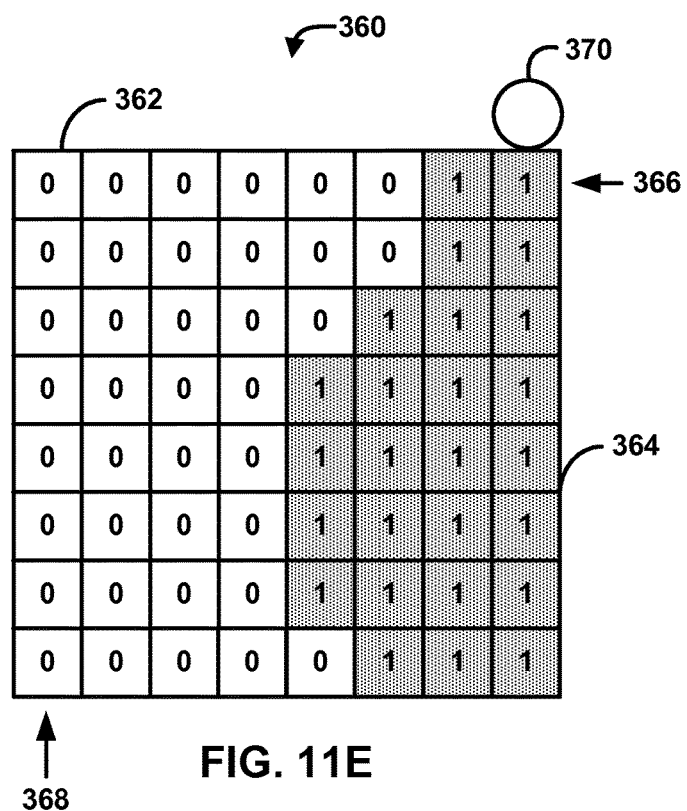

FIG. 11E generally illustrates a depth block 360 having a first partition 362 and a second partition 364. The partition pattern shown in FIG. 11E is another example of pattern 2. In this example, second partition 364 (the partition for which a DC predicted value is being generated) includes at least one sample of top row 366 but does not include any samples of left column 368 of block 360. The top left sample and bottom left sample of block 360 are assigned to a different partition (first partition 362) than a partition containing the top right sample (second partition 364).

Upon identifying pattern 2, a video coder (such as video encoder 20 or video decoder 30) may determine a DC predicted value for second partition 364 based on a representative neighboring sample 370 positioned at the end of top row 366 (i.e., adjacent to the top right corner sample of block 360). That is, the video coder may select the final sample in top row 366 as the representative neighboring sample for second partition 364. Selecting the final sample of top row 366 may help to ensure that the representative sample is not positioned near the transition between first partition 362 and second partition 364 along top row 366. As noted above, selecting samples that are positioned away from partition boundaries may increase prediction accuracy. After selecting neighboring sample 370, the video coder may set the DC predicted value for second partition 364 to the value of neighboring sample 370.

Figure 11F:
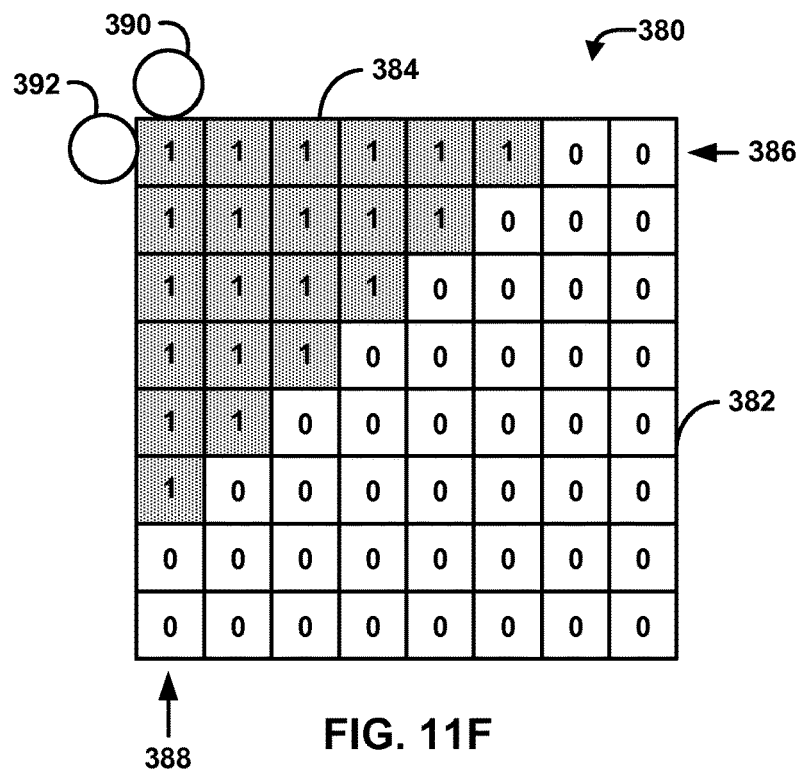

FIG. 11F generally illustrates a depth block 380 having a first partition 382 and a second partition 384. The partition pattern shown in FIG. 11F may generally be referred to as pattern 3. In this example, second partition 384 (the partition for which a DC predicted value is being generated) includes at least one sample of top row 386 and at least one sample of left column 388 of block 380. The top left sample of block 380 is assigned to a different partition (second partition 384) than a partition containing the top right sample and bottom left sample (first partition 382).

Upon identifying pattern 3, a video coder (such as video encoder 20 or video decoder 30) may determine a DC predicted value for second partition 384 based on a first representative neighboring sample 390 positioned above the top left corner sample of block 380 and a second representative neighboring sample 392 positioned to the left of the top left corner sample of block 380 (e.g., samples $pL_0$ and $pT_0$ as shown in FIG. 10). In this example, the video coder may combine first sample 390 and second sample 392 and perform a right shift operation to determine the average value of the samples (without performing a division operation). Selecting the samples in the upper-most corner of block 380 may help to ensure that the representative samples are not positioned near the transition between first partition 382 and second partition 384 along top row 386 or left column 388. In some examples, rather than selecting both sample 390 and sample 392 to determine the DC predicted value, the video coder may select one of sample 390 and sample 392.

Figure 11G:
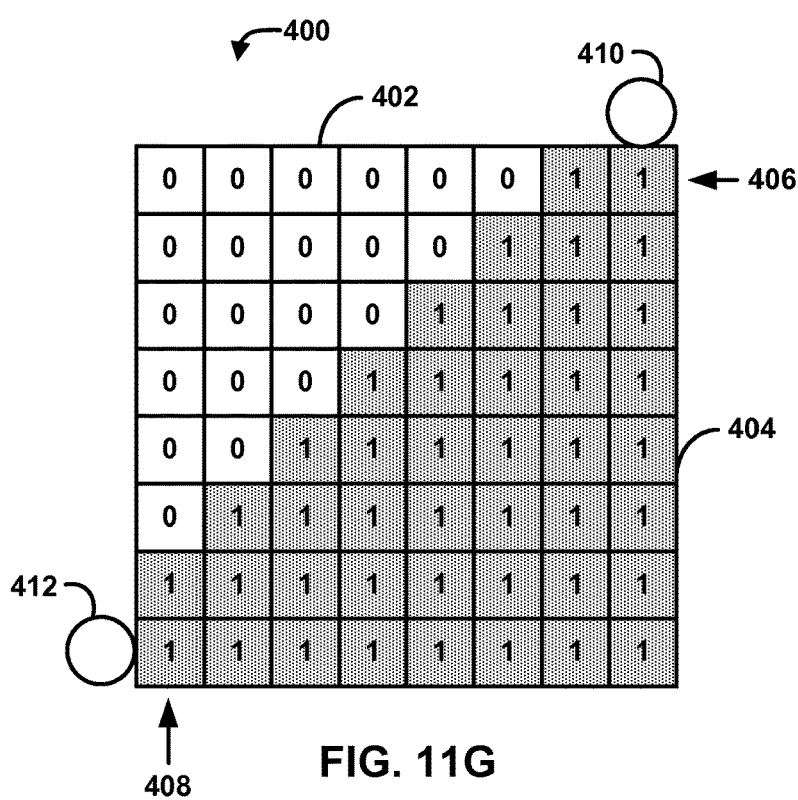

FIG. 11G generally illustrates a depth block 400 having a first partition 402 and a second partition 404. The partition pattern shown in FIG. 11G is another example of pattern 3. In this example, second partition 404 (the partition for which a DC predicted value is being generated) includes at least one sample of top row 406 and at least one sample of left column 408 of block 400. The top left sample of block 380 is assigned to a different partition (first partition 402) than a partition containing the top right sample and bottom left sample (second partition 404).

Upon identifying pattern 3, a video coder (such as video encoder 20 or video decoder 30) may determine a DC predicted value for second partition 404 based on a first representative neighboring sample 410 positioned above the top right corner sample of block 400 and a second representative neighboring sample 412 positioned to the left of the bottom left corner sample of block 400 (e.g., samples $pL_{N-1}$ and $pT_{N-1}$, as shown in FIG. 10). In this example, the video coder may combine first sample 410 and second sample 412 and perform a right shift operation to determine the average value of the samples (without performing a division operation). Selecting the samples in the opposite corners of block 400 may help to ensure that the representative samples are not positioned near the transition between first partition 402 and second partition 404 along top row 406 or left column 408. In some examples, rather than selecting both sample 410 and sample 412 to determine the DC predicted value, the video coder may select one of sample 410 and sample 412.

Figure 11H:
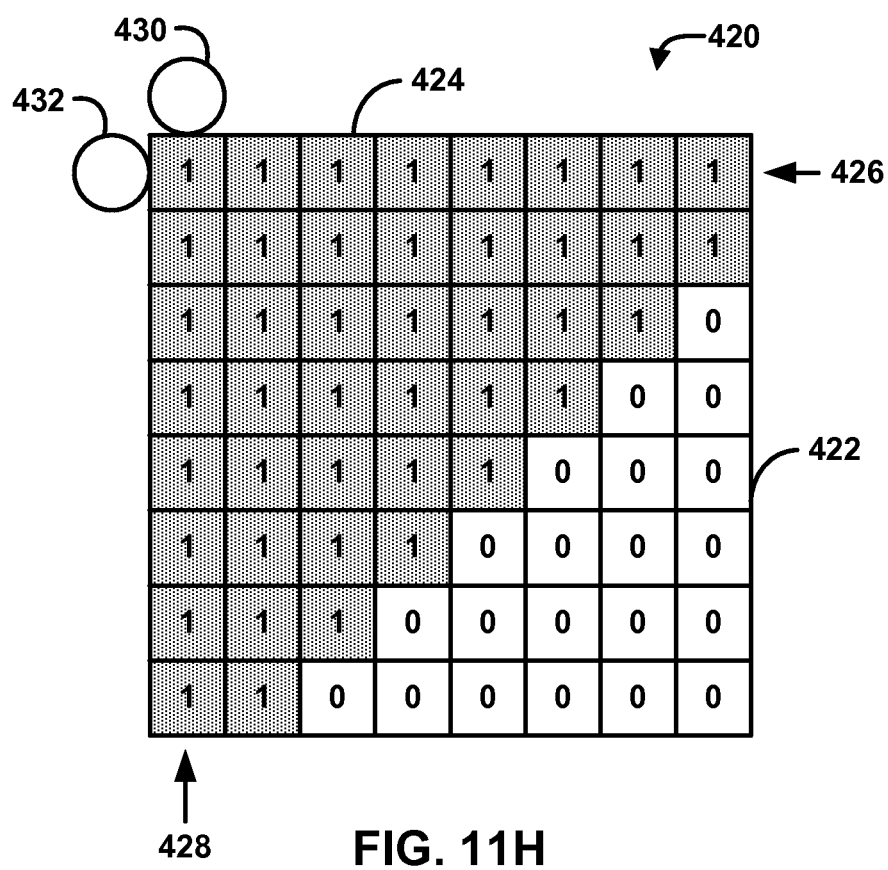

FIG. 11H generally illustrates a depth block 420 having a first partition 422 and a second partition 424. The partition pattern shown in FIG. 11H may generally be referred to as pattern 4. In this example, second partition 424 (the partition for which a DC predicted value is being generated) includes all samples of top row 426 as well as all samples of left column 428 of block 420. The top left sample, top right sample, and bottom left sample of block 420 are all assigned to the same partition (second partition 424).

Upon identifying pattern 4, a video coder (such as video encoder 20 or video decoder 30) may determine a DC predicted value for second partition 424 based on a first representative neighboring sample 430 positioned above the top left corner sample of block 420 and a second representative neighboring sample 432 positioned to the left of the top left corner sample of block 420 (e.g., samples $pL_0$ and $pT_0$ as shown in FIG. 10). In this example, the video coder may combine first sample 430 and second sample 432 and perform a right shift operation to determine the average value of the samples (without performing a division operation). In some examples, rather than selecting both sample 430 and sample 432 to determine the DC predicted value, the video coder may select one of sample 430 and sample 432.

It should be understood that the examples provided with respect to FIGS. 11A-11H are provided for purposes of illustration only. That is, the techniques described above may be applied to blocks of depth values having other sizes and having a different arrangement of depth samples (certain depth samples assigned to different partitions. Moreover, the neighboring reference samples from which to determine a DC predicted value may also be different without departing from the techniques described above. For example, while the examples of FIG. 11A-11H describe selecting one or two representative neighboring reference samples, in other examples, the video coder may select more or fewer reference samples.

Figure 12:
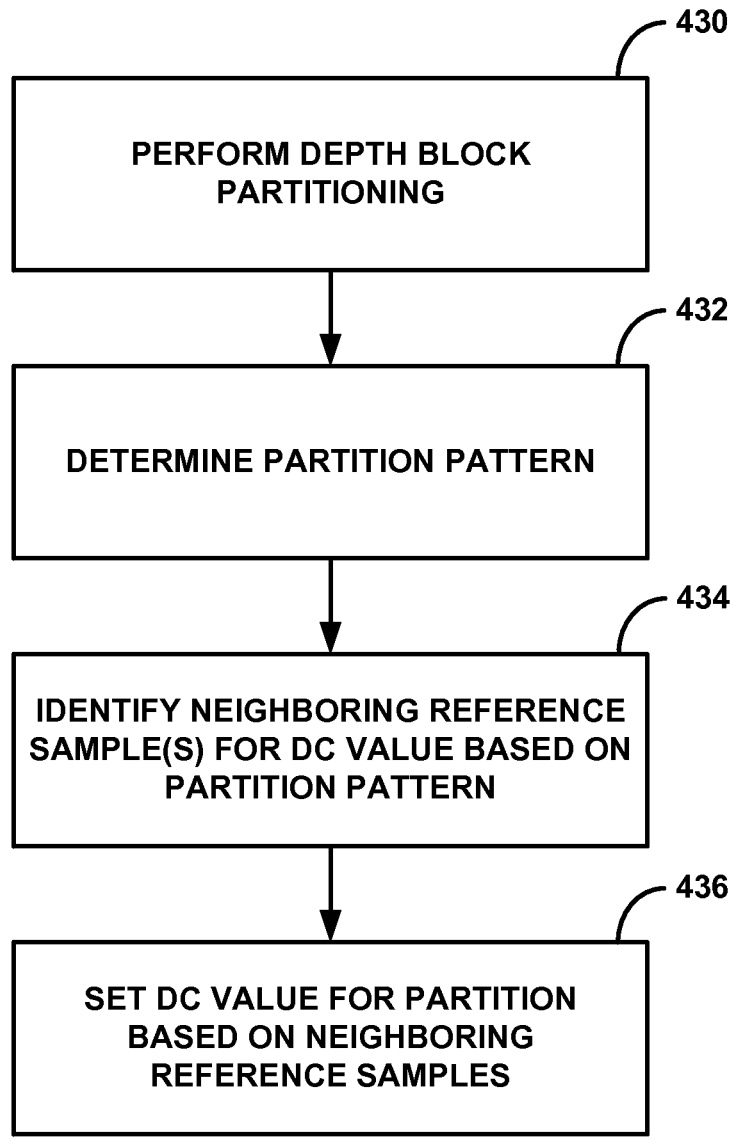
FIG. 12 is a flow diagram illustrating an example process for determining predicted values for one or more partitions of a block of depth data, according to aspects of this disclosure.

FIG. 12 is a flow diagram illustrating one example process for determining predicted values for one or more partitions of a block of depth data, according to aspects of this disclosure. While the process shown in FIG. 12 is generally described as being carried out by a video coder, it should be understood that the techniques may be performed by video encoder 20, video decoder 30, or a variety of other processors.

In the example of FIG. 12, the video coder may perform depth block partitioning (430). For example, the video coder may initially partition a depth block into regions using DMM modes, chain coding modes, SDC mode 2, or the like. When performing the partitioning, the video coder assigns samples of the block to a first partition or a second partition, as described above. In an example for purposes of illustration, assume that the video coder partitions an N×N block of depth values into a block binary values, i.e., $bPattern_{x,y}$, representing the partitioning, where x=0 . . . N−1, y=0 . . . N−1, and has neighboring reference samples of an array $p_{x,y}$, where x=−1, y=−1 . . . N−1 and x=0 . . . N−1, y=−1.

The video coder then determines a partitioning pattern for the depth block (432). Continuing with the example described above, the video coder may determine a partitioning pattern based on the following steps:
1. Set variables bL and bT to false and variables $V_0$ and $V_1$ to 0;
2. For x=0 . . . N−2, bT is set as true when $bPattern_{x,0}$ is not equal to $bPattern_{x+1,0}$, and bL is set as true when $bPattern_{0,x}$ is not equal to $bPattern_{0,x+1}$;

In this example, the video coder identifies a partition boundary along the top row of the block and along the left column of the block by checking each sample of the top row and left column to identify a transition from a binary partition value of 0 to a binary partition value of 1 (or vice versa). With this information, the video coder determines a partitioning pattern, such as one of the example partitioning patterns shown in FIGS. 11A-11H above.

In another example, the video coder may determine a partitioning pattern based on a sub-set of depth values. For example, as noted above, it may not be necessary to determine the precise location of a partition boundary to determine a partition pattern. In one example, step 2 above may be replaced with the following step:
2. Set bT true when $bPattern_{0,0}$ is not equal to $bPattern_{N-1,0}$, and bL true when $bPattern_{0,0}$ is not equal to $bPattern_{0,N-1}$.

In this example, the video coder determines the partition pattern based on the outermost samples of the depth block, as described above.

Based on the determined partition pattern, the video coder may identify one or more neighboring reference samples as representative samples for a DC predicted value (434). For example, the video coder may identify a neighboring reference sample that is positioned to avoid partition boundaries. Continuing with the example described above, the video coder may identify neighboring reference samples based on the following steps:
3. For bL and bT:
  i. If bL is equal to bT:
    a. Set $V_1$ as $(p_{-1,0}+p_{0,-1})>>1$;
    b. If bL is true, set $V_0$ as $(p_{-1,N-1}+p_{N-1,-1})>>1$; Otherwise, set $V_0$ as $1<<(B-1)$;
  ii. Otherwise:
    a. If bL is true, set $V_0$ as $p_{-1,N-1}$ and set $V_1$ as $p_{(N-1)>>1,-1}$;
    b. Otherwise, set $V_0$ as $p_{N-1,-1}$ and set $V_1$ as $p_{-1,\,(N-1)>>1}$;

In the example above, if transition variables bL and bT are equal (there is no partition boundary in the top row or left column, or the is a partition boundary in both the top row and left column) the video coder sets one partition variable $V_1$ to a right shifted combination of a neighboring reference sample that is positioned above the top left corner sample of the block and a neighboring reference sample that is positioned to the left of the top left corner sample of the block. In addition, if the transition variable for the left column bL is true (there is a partition boundary in the left column) the video coder sets a partition variable $V_0$ to a right shifted combination of a neighboring reference value at the end of the top row of depth samples and a neighboring reference value at the end of the left column of depth samples.

If transition variables bL and bT are not equal (there is only one partition boundary in either the top row or left column) and bL is true (the partition boundary is along the left column of samples) the video coder sets one partition variable $V_0$ to the neighboring reference sample that is positioned at the end (bottom) of the left column of the block. The video coder also sets the other partition variable $V_1$ to the neighboring reference sample that is positioned at the end (furthest right) of the top row of the block.

If transition variables bL and bT are not equal (there is only one partition boundary in either the top row or left column) and bL is not true (the partition boundary is along the top row of samples) the video coder sets one partition variable $V_0$ to the neighboring reference sample that is positioned at the end (furthest right) of the top row of the block. The video coder also sets the other partition variable $V_1$ to the neighboring reference sample that is positioned at the end (bottom) of the left column of the block.

The video coder then sets predicted DC values for each partition based on the identified neighboring reference samples (436). Continuing with the example above, the video coder may perform the following step:

4. If $bPattern_{0,0}$ equals 1, set $DC_0$ as $V_0$ and set $DC_1$ as $V_1$; Otherwise, set $DC_0$ as $V_1$ and set $DC_1$ as $V_0$.

In this example, if the top left corner sample of the block belongs to a second partition (partition 1), the video coder sets a first DC predicted value $DC_0$ as variable $V_0$ and a second DC predicted value $DC_1$ as variable $V_1$. If the top left corner sample of the block belongs to a first partition (partition 0), the video coder sets a first DC predicted value $DC_0$ as variable $V_1$ and a second DC predicted value $DC_1$ as variable $V_0$.

In an example, modifications to the current draft of 3D-HEVC for a process that identifies a partition boundary based on all samples of a top row and left column (as described with respect to the first step 2 above) are shown below. Modifications are shown using bold and strikethrough to indicate deletions and bold and italics so indicate additions:

G.8.4.4.2.12 Depth Partition Value Derivation and Assignment Process

---

Inputs to this process are:
— neighbouring samples p[ x ][ y ], with x, y = −1..2*nT−1,
— a binary array partitionPattern[ x ][ y ], with x, y =0..nT−1, specifying a partitioning of the prediction block in a partition 0 and a partition 1.
— a variable nT specifying the transform size,
— a flag dcOffsetAvailFlag, specifying whether DC Offset values are available
— the variables quantDcOffsetP0 and quantCcOffsetP1, specifying the DC offsets for the block partitions Output of this process is:
— predicted samples predSamples[ x ][ y ], with x, y =0..nT−1.

~~For X being replaced by 0 and 1,~~ The values of the prediction samples predSamples[ x ][ y ] are derived as specified by the following ordered steps:

1. ~~The variable sumNeigh specifying the sum of the neighbouring samples depth values of partition X is set equal to 0 and the variable numNeigh specifying the number of the neighbouring samples of partition X is set equal to 0~~ *The variables bL and bT are set as false* and the following applies.
   — For x = 0..nT − 1, the following applies.
     — When partitionPattern[ x ][ 0 ] is not equal to partitionPattern[ x+1 ][ 0 ], the following applies:
       ~~sumNeigh += p[ x ][ −1 ]  (G-59)~~
       ~~numNeigh += 1  (G-60)~~
       *bT = true*  *(G-59)*
   — For y = 0..nT − 1, the following applies.
     — When partitionPattern[ 0, y ] is not equal to ~~*~~ partitionPattern[ 0 ][ y+1 ], the following applies:
       ~~sumNeigh += 1 p[ −1 ][ y ]  (G-61)~~
       ~~numNeigh += 1  (G-62)~~
       *bL = true*  *(G-60)*

2. The variables predDcVal0 and predDcVal1 specifying the predicted constant partition values for partition ARTWORK 0 and 1, respectively, are derived as follows.
   — *If bL is equal to bT, the following applies. :*
     *dcVal0 = bL ? (p[ −1 ][ nT − 1 ] + p[ nT − 1 ][ −1 ])>>1 : 1 << ( BitDepth$_Y$ − 1)  (G-61)*
     *dcVal1 = (p[ −1 ][ 0 ] + p[ 0 ][ −1 ])>>1  (G-62)*
   — *Otherwise, the following applies. :*
     *dcVal0 = bL ? p[ −1 ][ nT − 1 ] : p[ nT − 1 ][ −1 ]  (G-63)*
     *dcVal1 = bL ? p[ (nT − 1) >> 1 ][ −1 ] : p[ −1 ][ (nT − 1) >> 1 ]  (G-64)*
   *predDcVal0 = partitionPattern[ 0 ][ 0 ] ? dcVal1 : dcVal0*
   *predDcVal1 = partitionPattern[ 0 ][ 0 ] ? dcVal1 : dcVal0*
   ~~predDcVal = ( numNeigh != 0 ) ? X ( sumNeigh / numNeigh ) : ( 1 <<( BitDepth$_Y$ −1 ))  (G-63)~~

*For X being replaced by 0 and 1, the following applies.*
1. The variable deQuantDcOffset specifying the de-quantized DC offset is derived as follows.
   — If dcOffsetAvailFlag is equal to 1, the following applies. :
     dcOffset = quantDcOffsetPX * Clip3( 1, ( 1 << BitDepth$_Y$ ) − 1, Round( 2$^{(QP'_Y/10)-2}$ ) )  (G-64)
   — Otherwise ( dcOffsetAvailFlag is equal to 0), deQuantDcOffset is set equal to 0.

2. The predicted sample values predSamples are derived as follows for x = 0..nT−1 and for y = 0..nT−1.
   — When partitionPattern[ x ][ y ] is equal to X, the following applies.
      predSamples[ x ][ y ] = predDcVal*X* + dcOffset   (G-65)

In another example, modifications to the current draft of 3D-HEVC for a process that identifies a partition boundary based on a sub-set of samples of a top row and left column (as described with respect to the second step 2 above) are shown below. Modifications are shown using ~~bold and strikethrough~~ to indicate deletions and bold and italics so indicate additions:

G.8.4.4.2.12 Depth Partition Value Derivation and Assignment Process

Inputs to this process are:
— neighbouring samples p[ x ][ y ], with x, y = −1..2*nT−1,
— a binary array partitionPattern[ x ][ y ], with x, y =0..nT−1, specifying a partitioning of the prediction block in a partition 0 and a partition 1.
— a variable nT specifying the transform size,
— a flag dcOffsetAvailFlag, specifying whether DC Offset values are available
— the variables quantDcOffsetP0 and quantCcOffsetP1, specifying the DC offsets for the block partitions
Output of this process is:
— predicted samples predSamples[ x ][ y ], with x, y =0..nT−1.
~~For X being replaced by 0 and 1,~~ The values of the prediction samples predSamples[ x ][ y ] are derived as specified by the following ordered steps:
1. *1. The following applies,*
   *bT = (partitionPattern[ 0 ][ 0 ] != partitionPattern[ nT-1 ][ 0 ] ) ? true : false (G-59)*
   *bL = (partitionPattern[ 0 ][ 0 ] != partitionPattern[ 0 ] [ nT-1 ]) ? true : false (G-60)*
   ~~The variable sumNeigh specifying the sum of the neighbouring samples depth values of partition X is set equal to 0 and the variable numNeigh specifying the number of the neighbouring samples of partition X is set equal to 0 and the following applies~~
      ~~For x = 0 .. nT - 1, the following applies~~
         ~~When partitionPattern [ x ][ 0 ] is not equal to X partitionPattern [ x + 1 ][ 0 ], the following applies:~~
            ~~sumNeigh + = p [ x ][ -1 ]   (G-59)~~
            ~~numNeigh + = 1   (G-60)~~
      ~~For y = 0 .. nT - 1, the following applies.~~
         ~~When partitionPattern [ 0,y ] is not equal to X partitionPattern [ 0 ][ y + 1 ], the following applies:~~
            ~~sumNeigh + = p [ -1 ][ y ],   (G-61)~~
            ~~numNeigh + = 1   (G-62)~~
2. The variables predDcVal*0* and *predDcVal1* specifying the predicted constant partition values for partition *X0 and 1, respectively,* are derived as follows.
   *— If bL is equal to bT, the following applies. :*
      *dcVal0 = bL ? (p[ -1 ][ nT-1 ] + p[ nT-1 ][ -1 ])>>1 : 1 <<*
      *( BitDepth_Y - 1)  (G-61)*
      *dcVal1 = (p[ -1 ][ 0 ] + p[ 0 ][ -1 ])>>1  (G-62)*
   *—Otherwise, the following applies. :*
      *dcVal0 = bL ? p[ -1 ][ nT-1 ] : p[ nT-1 ][ -1 ]  (G-63)*
      *dcVal1 = bL ? p[ (nT-1) >> 1 ][ -1 ] : p[ -1 ][ (nT-1) >> 1 ]  (G-64)*
      *predDcVal0 = partitionPattern[ 0 ][ 0 ] ? DcVal0 : dcVal1*
      *predDcVal1 = partitionPattern[ 0 ][ 0 ] ? DcVal1 : dcVal0*
            ~~predDcVal = ( numNeigh != 0 ) ? ( sumNeigh / numNeigh ) : ( 1 << (~~
            ~~BitDepth_Y = 1 )   (G-63)~~

*For X being replaced by 0 and 1, the following applies.*
1. The variable deQuantDcOffset specifying the de-quantized DC offset is derived as follows.
   — If dcOffsetAvailFlag is equal to 1, the following applies. :
      dcOffset = quantDcOffsetPX * Clip3( 1, ( 1 << BitDepth$_Y$ ) − 1, Round( 2$^{(QP'_Y/10)- 2}$ ) )  (G-64)
   — Otherwise ( dcOffsetAvailFlag is equal to 0), deQuantDcOffset is set equal to 0.
2. The predicted sample values predSamples are derived as follows for x = 0..nT−1 and for y = 0..nT−1.
   — When partitionPattern[ x ][ y ] is equal to X, the following applies.
      predSamples[ x ][ y ] = predDcValX + dcOffset  (G-65)

It should be understood that the steps shown in FIG. 12 are provided as merely one example. That is, the steps shown in FIG. 12 need not necessarily be performed in the order shown, and fewer, additional, or alternative steps may be performed.

Figure 13:
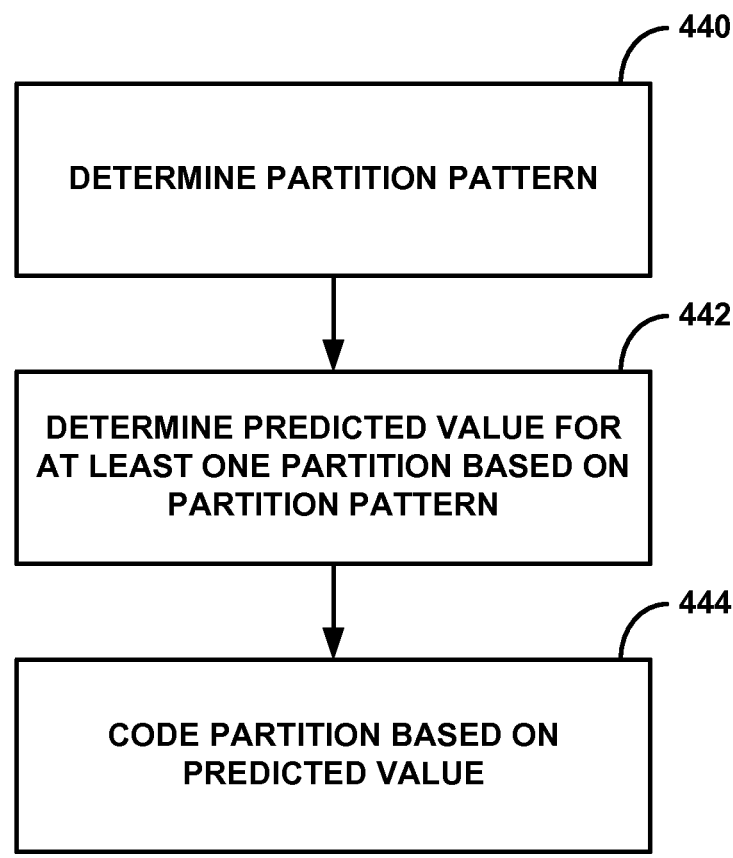
FIG. 13 is a flow diagram illustrating an example process for coding partitions of a block of depth data, according to aspects of this disclosure.

FIG. 13 is a flow diagram illustrating an example process for coding partitions of a block of depth data, according to aspects of this disclosure. While the process shown in FIG. 13 is generally described as being carried out by a video coder, it should be understood that the techniques may be performed by video encoder 20, video decoder 30, or a variety of other processors.

In the example of FIG. 13, the video coder determines a partition pattern (440). As noted above, the video coder may determine a partition pattern based on all of the samples of a top row and left column of a depth block. In another example, the video coder may determine a partition pattern based on a sub-set of samples of a top row and left column of a depth block. In any case, the video coder may determine a partition pattern based on the location of partition boundaries along the top row and/or left column of samples of a depth block, as described above.

The video coder may then determine a predicted value for at least one partition of the block based on the partition pattern (442). For example, the video coder may determine a predetermined, default value, or may determine a value bases on one or more neighboring reference samples. As described above, the video coder may select representative neighboring reference samples based on the partition pattern (e.g., the location of partition boundaries).

The video coder may then code the at least one partition based on the predicted value. For example, a video encoder (such as video encoder 20) may generate residual values based on a difference between the actual depth values of a partition and the predicted value of the partition, and may include data representing the residual values in an encoded bitstream. A video decoder may parse data representing residual values from an encoded bitstream, generate a predicted value of a partition, and combine the residual values with the predicted value to determine the actual depth values for the partition.

It should be understood that the steps shown in FIG. 13 are provided as merely one example. That is, the steps shown in FIG. 13 need not necessarily be performed in the order shown, and fewer, additional, or alternative steps may be performed.

The techniques described above may be performed by video encoder 20 (FIGS. 1 and 2) and/or video decoder 30 (FIGS. 1 and 3), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards not yet developed. For example, the techniques for depth coding may also be applicable to a multi-view extension of HEVC (e.g., so called MV-HEVC), a scalable extension to HEVC, or other current or future standards having a depth component.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium and packaging materials.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of processing video data, the method comprising:
    determining a partitioning pattern for a block of depth values comprising assigning one or more samples of the block to a first partition and assigning one or more other samples of the block to a second partition;
    comparing a depth sample of a top row of the block to an N−1 depth sample of the top row of the block to determine whether a first partition boundary is included in the top row of the block, wherein the top row has N depth samples, and the depth sample of the top row is not adjacent to the N−1 depth sample of the top row;
    comparing a depth sample of a left column of the block to an N−1 depth sample of the left column of the block to determine whether a second partition boundary is included in the left column of the block, wherein the left column has N depth samples, and the depth sample of the left column is not adjacent to the N−1 depth sample of the left column;
    determining a first predicted value and a second predicted value based on whether the first partition boundary is included in the top row and whether the second partition boundary is included in the left column of the block, wherein determining the first predicted value and the second predicted value comprises selecting, to avoid partition boundaries, one or more reference samples that neighbor one or more of the first partition and the second partition; and
    coding the at least one of the first partition and the second partition based on one or more of the first predicted value and the second predicted value.

2. The method of claim 1, wherein determining the first predicted value for the first partition further comprises identifying exactly one reference sample that neighbors the first partition and setting the first predicted value for the first partition to a value of the exactly one reference sample.

3. The method of claim 1, wherein determining the first predicted value for the first partition further comprises identifying exactly two reference samples that neighbor the first partition and setting the first predicted value for the first partition to an average value of the exactly two reference samples.

4. The method of claim 1,
    wherein determining the first predicted value for the first partition further comprises identifying a reference sample that neighbors the first partition and setting the predicted value for the first partition to a value of the reference sample, and
    wherein determining the predicted value for the second partition further comprises determining a default value and setting the second predicted value for the second partition to the default value.

5. The method of claim 1, wherein, when the block includes both the first partition boundary and the second partition boundary and a sample of the top left corner of the block is assigned to the first partition, determining the first predicted value and the second predicted value comprises:
    setting the first predicted value to a combination of a neighboring reference sample located above an N−1 sample of the top row and a neighboring reference sample located to the left of an N−1 sample of the left column, where the top row and left column have N samples, and
    setting the second predicted value to a combination of a neighboring reference sample located above a first sample of the top row and a neighboring reference sample located to the left of a first sample of the left column.

6. The method of claim 1, wherein, when the block does not include the first partition boundary and does not include the second partition boundary and a sample of the top left corner of the block is assigned to the first partition, determining the first predicted value and the second predicted value comprises:
    setting the first predicted value to a predetermined, default value, and
    setting the second predicted value to a combination of a neighboring reference sample located above a first sample of the top row and a neighboring reference sample located to the left of a first sample of the left column.

7. The method of claim 1, wherein, when the block includes the first partition boundary and does not include the second partition boundary and a sample of the top left corner of the block is assigned to the first partition, determining the first predicted value and the second predicted value comprises:
    setting the first predicted value to a neighboring reference sample located above an N−1 sample of the top row, where the top row has N samples, and
    setting the second predicted value to a neighboring reference sample located to the left of an N−1 sample of the left column, where the left column has N samples.

8. The method of claim 1, wherein, when the block does not include the first partition boundary and includes the second partition boundary and a sample of the top left corner of the block is assigned to the first partition, determining the first predicted value and the second predicted value comprises:
    setting the first predicted value to a neighboring reference sample located to the left of an N−1 sample of the left column, where the left column has N samples, and
    setting the second predicted value to a neighboring reference sample located above an N−1 sample of the top row, where the top row has N samples.

9. The method of claim 1, wherein coding the at least one of the first partition and the second partition comprises decoding the at least one of the first partition and the second partition, and wherein decoding comprises:

parsing one or more residual values from an encoded bitstream, and combining the one or more residual values with one or more of the first predicted value and the second predicted value for at least one of the first partition and the second partition to reconstruct depth values of the block.

10. The method of claim 1, wherein coding the at least one of the first partition and the second partition comprises encoding the at least one of the first partition and the second partition, and wherein encoding comprises:

determining one or more residual values based on a difference between depth values of the block and one or more of the first predicted value and the second predicted value for at least one of the first partition and the second partition, and encoding data representing the one or more residual values to form an encoded bitstream.

11. An apparatus for processing video data, the apparatus comprising:

a memory configured to store a block of depth values; and
one or more processors configured to:
determine a partitioning pattern for the block of depth values comprising assigning one or more samples of the block to a first partition and assigning one or more other samples of the block to a second partition;
compare a depth sample of a top row of the block to an N−1 depth sample of the top row of the block to determine whether a first partition boundary is included in the top row of the block, wherein the top row has N depth samples, and the depth sample of the top row is not adjacent to the N−1 depth sample of the top row;
compare a depth sample of a left column of the block to an N−1 depth sample of the left column of the block to determine whether a second partition boundary is included in the left column of the block, wherein the left column has N depth samples, and the depth sample of the left column is not adjacent to the N−1 depth sample of the left column; and
determine a first predicted value and a second predicted value based on whether the first partition boundary is included in the top row and whether the second partition boundary is included in the left column of the block, including selecting, to avoid partition boundaries, one or more reference samples that neighbor one or more of the first partition and the second partition; and
code the at least one of the first partition and the second partition based on one or more of the first predicted value and the second predicted value.

12. The apparatus of claim 11, wherein the one or more processors are configured to identify exactly one reference sample that neighbors the first partition and setting the first predicted value for the first partition to a value of the exactly one reference sample.

13. The apparatus of claim 11, wherein the one or more processors are configured to identify exactly two reference samples that neighbor the first partition and setting the first predicted value for the first partition to an average value of the exactly two reference samples.

14. The apparatus of claim 11,
wherein the one or more processors are configured to identify a reference sample that neighbors the first partition and set the predicted value for the first partition to a value of the reference sample, and
wherein to determine the predicted value for the second partition, the one or more processors are further configured to determine a default value and set the second predicted value for the second partition to the default value.

15. The apparatus of claim 11, wherein, when the block includes both the first partition boundary and the second partition boundary and a sample of the top left corner of the block is assigned to the first partition, to determine the first predicted value and the second predicted value, the one or more processors are configured to:

set the first predicted value to a combination of a neighboring reference sample located above an N−1 sample of the top row and a neighboring reference sample located to the left of an N−1 sample of the left column, where the top row and left column have N samples, and set the second predicted value to a combination of a neighboring reference sample located above a first sample of the top row and a neighboring reference sample located to the left of a first sample of the left column.

16. The apparatus of claim 11, wherein, when the block does not include the first partition boundary and does not include the second partition boundary and a sample of the top left corner of the block is assigned to the first partition, to determine the first predicted value and the second predicted value, the one or more processors are configured to:

set the first predicted value to a predetermined, default value, and set the second predicted value to a combination of a neighboring reference sample located above a first sample of the top row and a neighboring reference sample located to the left of a first sample of the left column.

17. The apparatus of claim 11, wherein, when the block includes the first partition boundary and does not include the second partition boundary and a sample of the top left corner of the block is assigned to the first partition, to determine the first predicted value and the second predicted value, the one or more processors are configured to:

set the first predicted value to a neighboring reference sample located above an N−1 sample of the top row, where the top row has N samples, and set the second predicted value to a neighboring reference sample located to the left of an N−1 sample of the left column, where the left column has N samples.

18. The apparatus of claim 11, wherein, when the block does not include the first partition boundary and includes the second partition boundary and a sample of the top left corner of the block is assigned to the first partition, to determine the first predicted value and the second predicted value, the one or more processors are configured to:

set the first predicted value to a neighboring reference sample located to the left of an N−1 sample of the left column, where the left column has N samples, and set the second predicted value to a neighboring reference sample located above an N−1 sample of the top row, where the top row has N samples.

19. The apparatus of claim 11, wherein the one or more processors are configured to decode the at least one of the first partition and the second partition, and wherein to decode, the one or more processors are configured to:

parse one or more residual values from an encoded bitstream, and combine the one or more residual values with one or more of the first predicted value and the second predicted value for at least one of the first partition and the second partition to reconstruct depth values of the block.

20. The apparatus of claim 11, wherein the one or more processors are configured to encode the at least one of the first partition and the second partition, and wherein to encode, the one or more processors are configured to:
- determine one or more residual values based on a difference between depth values of the block and one or more of the first predicted value and the second predicted value for at least one of the first partition and the second partition, and
- encode data representing the one or more residual values to form an encoded bitstream.

21. An apparatus for processing video data, the apparatus comprising:
- means for determining a partitioning pattern for a block of depth values comprising assigning one or more samples of the block to a first partition and assigning one or more other samples of the block to a second partition;
- means for comparing a depth sample of a top row of the block to an N−1 depth sample of the top row of the block to determine whether a first partition boundary is included in the top row of the block, wherein the top row has N depth samples, and the depth sample of the top row is not adjacent to the N−1 depth sample of the top row;
- means for comparing a depth sample of a left column of the block to an N−1 depth sample of the left column of the block to determine whether a second partition boundary is included in the left column of the block, wherein the left column has N depth samples, and the depth sample of the left column is not adjacent to the N−1 depth sample of the left column;
- means for determining a first predicted value and a second predicted value based on whether the first partition boundary is included in the top row and whether the second partition boundary is included in the left column of the block, wherein determining the first predicted value and the second predicted value comprises selecting, to avoid partition boundaries, one or more reference samples that neighbor one or more of the first partition and the second partition; and
- means for coding the at least one of the first partition and the second partition based on one or more of the first predicted value and the second predicted value.

22. The apparatus of claim 21, wherein the means for determining the first predicted value for the first partition further comprises means for identifying exactly one reference sample that neighbors the first partition and setting the first predicted value for the first partition to a value of the exactly one reference sample.

23. The apparatus of claim 21, wherein the means for determining the first predicted value for the first partition further comprises means for identifying exactly two reference samples that neighbor the first partition and setting the first predicted value for the first partition to an average value of the exactly two reference samples.

24. The apparatus of claim 21,
- wherein the means for determining the first predicted value for the first partition further comprises means for identifying a reference sample that neighbors the first partition and setting the first predicted value for the first partition to a value of the reference sample, and
- wherein the means for determining the second predicted value for the second partition further comprises means for determining a default value and setting the second predicted value for the second partition to the default value.

25. The apparatus of claim 21, wherein, when the block includes both the first partition boundary and the second partition boundary and a sample of the top left corner of the block is assigned to the first partition, the means for determining the first predicted value and the second predicted value comprises:
- means for setting the first predicted value to a combination of a neighboring reference sample located above an N−1 sample of the top row and a neighboring reference sample located to the left of an N−1 sample of the left column, where the top row and left column have N samples, and
- means for setting the second predicted value to a combination of a neighboring reference sample located above a first sample of the top row and a neighboring reference sample located to the left of a first sample of the left column.

26. The apparatus of claim 21, wherein, when the block does not include the first partition boundary and does not include the second partition boundary and a sample of the top left corner of the block is assigned to the first partition, the means for determining the first predicted value and the second predicted value comprises:
- means for setting the first predicted value to a predetermined, default value, and
- means for setting the second predicted value to a combination of a neighboring reference sample located above a first sample of the top row and a neighboring reference sample located to the left of a first sample of the left column.

27. The apparatus of claim 21, wherein, when the block includes the first partition boundary and does not include the second partition boundary and a sample of the top left corner of the block is assigned to the first partition, the means for determining the first predicted value and the second predicted value comprises:
- means for setting the first predicted value to a neighboring reference sample located above an N−1 sample of the top row, where the top row has N samples, and
- means for setting the second predicted value to a neighboring reference sample located to the left of an N−1 sample of the left column, where the left column has N samples.

28. The apparatus of claim 21, wherein, when the block does not include the first partition boundary and includes the second partition boundary and a sample of the top left corner of the block is assigned to the first partition, the means for determining the first predicted value and the second predicted value comprises:
- means for setting the first predicted value to a neighboring reference sample located to the left of an N−1 sample of the left column, where the left column has N samples, and
- means for setting the second predicted value to a neighboring reference sample located above an N−1 sample of the top row, where the top row has N samples.

29. A non-transitory computer-readable medium comprising instructions stored thereon that, when executed, cause one or more processors to:
- determine a partitioning pattern for a block of depth values comprising assigning one or more samples of the block to a first partition and assigning one or more other samples of the block to a second partition;
- compare a depth sample of a top row of the block to an N−1 depth sample of the top row of the block to determine whether a first partition boundary is included in the top row of the block, wherein the top row has N depth samples, and the depth sample of the top row is not adjacent to the N−1 depth sample of the top row;

compare a depth sample of a left column of the block to an N−1 depth sample of the left column of the block to determine whether a second partition boundary is included in the left column of the block, wherein the left column has N depth samples, and the depth sample of the left column is not adjacent to the N−1 depth sample of the left column;

determine a first predicted value and a second predicted value based on whether the first partition boundary is included in the top row and whether the second partition boundary is included in the left column of the block, wherein determining the first predicted value and the second predicted value comprises selecting, to avoid partition boundaries, one or more reference samples that neighbor one or more of the first partition and the second partition; and code the at least one of the first partition and the second partition based on the predicted value.

30. The computer-readable medium of claim 29, wherein to determine the first predicted value for the first partition, the instructions cause the one or more processors to identify exactly one reference sample that neighbors the first partition and setting the first predicted value for the first partition to a value of the exactly one reference sample.

31. The computer-readable medium of claim 29, wherein to determine the first predicted value for the first partition, the instructions cause the one or more processors to identify exactly two reference samples that neighbor the first partition and setting the first predicted value for the first partition to an average value of the exactly two reference samples.

32. The computer-readable medium of claim 29,
wherein to determine the first predicted value for the first partition, the instructions cause the one or more processors to identify a reference sample that neighbors the first partition and set the first predicted value for the first partition to a value of the reference sample, and wherein to determine the second predicted value for the second partition, the instructions cause the one or more processors to determine a default value and set the second predicted value for the second partition to the default value.

33. The computer-readable medium of claim 29, wherein, when the block includes both the first partition boundary and the second partition boundary and a sample of the top left corner of the block is assigned to the first partition, to determine the first predicted value and the second predicted value, the instructions cause the one or more processors to:

set the first predicted value to a combination of a neighboring reference sample located above an N−1 sample of the top row and a neighboring reference sample located to the left of an N−1 sample of the left column, where the top row and left column have N samples, and set the second predicted value to a combination of a neighboring reference sample located above a first sample of the top row and a neighboring reference sample located to the left of a first sample of the left column.

34. The computer-readable medium of claim 29, wherein, when the block does not include the first partition boundary and does not include the second partition boundary and a sample of the top left corner of the block is assigned to the first partition, to determine the first predicted value and the second predicted value, the instructions cause the one or more processors to:

set the first predicted value to a predetermined, default value, and set the second predicted value to a combination of a neighboring reference sample located above a first sample of the top row and a neighboring reference sample located to the left of a first sample of the left column.

35. The computer-readable medium of claim 29 wherein, when the block includes the first partition boundary and does not include the second partition boundary and a sample of the top left corner of the block is assigned to the first partition, to determine the first predicted value and the second predicted value, the instructions cause the one or more processors to:

set the first predicted value to a neighboring reference sample located above an N−1 sample of the top row, where the top row has N samples, and set the second predicted value to a neighboring reference sample located to the left of an N−1 sample of the left column, where the left column has N samples.

36. The computer-readable medium of claim 29, wherein, when the block does not include the first partition boundary and includes the second partition boundary and a sample of the top left corner of the block is assigned to the first partition, to determine the first predicted value and the second predicted value, the instructions cause the one or more processors to:

set the first predicted value to a neighboring reference sample located to the left of an N−1 sample of the left column, where the left column has N samples, and set the second predicted value to a neighboring reference sample located above an N−1 sample of the top row, where the top row has N samples.

* * * * *